(12) United States Patent
Kawanabe et al.

(10) Patent No.: US 7,095,520 B2
(45) Date of Patent: Aug. 22, 2006

(54) INFORMATION PROCESSING APPARATUS AND SYSTEM, INFORMATION PROCESSING METHOD AND DEVICE DRIVER

(75) Inventors: Tetsuya Kawanabe, Kanagawa (JP); Jiro Moriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 888 days.

(21) Appl. No.: 09/945,797

(22) Filed: Sep. 5, 2001

(65) Prior Publication Data

US 2002/0030839 A1    Mar. 14, 2002

(30) Foreign Application Priority Data

Sep. 11, 2000    (JP) ............................. 2000-275486

(51) Int. Cl.
G06F 3/12 (2006.01)
G06F 15/00 (2006.01)
G06K 1/00 (2006.01)

(52) U.S. Cl. ....................... 358/1.15; 358/1.9; 358/1.2; 358/1.15; 358/1.16; 101/128.4

(58) Field of Classification Search .............. 358/1.15, 358/1.16, 1.2, 19; 101/128.4
See application file for complete search history.

(56) References Cited

U.S. PATENT DOCUMENTS

| | | | |
|---|---|---|---|
| 5,450,571 A | 9/1995 | Rosekrans et al. | 395/500 |
| 5,585,833 A | 12/1996 | Matumoto | 347/183 |
| 5,706,410 A | 1/1998 | Bagley et al. | 395/112 |
| 5,720,015 A | 2/1998 | Martin et al. | 358/1.15 |
| 5,724,627 A * | 3/1998 | Okuno et al. | 399/27 |
| 5,751,923 A * | 5/1998 | Matsuzawa | 358/1.15 |
| 5,764,934 A | 6/1998 | Fisch et al. | |
| 5,822,507 A | 10/1998 | Uda et al. | 395/114 |
| 5,906,442 A | 5/1999 | Kishida | 400/61 |
| 5,933,582 A * | 8/1999 | Yamada | 358/1.15 |
| 6,002,429 A | 12/1999 | Ochi et al. | 348/207 |
| 6,003,069 A | 12/1999 | Cavill | 709/205 |
| 6,125,748 A * | 10/2000 | Inamine | 101/128.4 |
| 6,128,098 A | 10/2000 | Kamada et al. | 358/1.8 |
| 6,147,770 A | 11/2000 | Unishi et al. | 358/1.2 |
| 6,172,765 B1 * | 1/2001 | Kawamoto | 358/1.2 |
| 6,198,542 B1 | 3/2001 | Tabata | 358/1.15 |
| 6,244,762 B1 * | 6/2001 | Fukano et al. | 400/70 |

(Continued)

FOREIGN PATENT DOCUMENTS

CN    1172301 A    2/1998

(Continued)

OTHER PUBLICATIONS

Jul. 27, 2005 European Search Report in EP 01121821.1.

*Primary Examiner*—Twyler M. Lamb
*Assistant Examiner*—Yixing Qin
(74) *Attorney, Agent, or Firm*—Fitzpatrick, Cella, Harper & Scinto

(57) ABSTRACT

Disclosed is an information processing system in which a high-order apparatus and a low-order apparatus are connected so as to be capable of bidirectional communicating. The low-order apparatus stores control command information of the low-order apparatus in a ROM and, in response to a request from the high-order apparatus, transmits the control command information to the high-order apparatus to store the information in a memory of the high-order apparatus. Using the control command information corresponding to the low-order apparatus stored in the memory, the high-order apparatus transmits print data to the low-order apparatus and controls the operation of the low-order apparatus.

52 Claims, 14 Drawing Sheets

| | U.S. PATENT DOCUMENTS | | |
|---|---|---|---|
| 6,674,535 B1 | 1/2004 | Kim | 358/1.15 |

FOREIGN PATENT DOCUMENTS

| EP | 0 756 225 A2 | 1/1997 |
|---|---|---|
| EP | 0 865 191 A2 | 9/1998 |
| EP | 1 024 424 A2 | 8/2000 |
| JP | 7-137356 | 5/1995 |
| JP | 8-310059 | 11/1996 |
| JP | 9-272233 | 10/1997 |
| JP | 10-65872 | 3/1998 |
| JP | 10-226140 | 8/1998 |
| JP | 11-227181 | 8/1999 |
| KR | 1998-0010805 | 4/1998 |
| KR | 1999-0063124 | 7/1999 |
| KR | 10-0243733 | 11/1999 |

* cited by examiner

FIG. 6

| Adr1 | Len1 |
|---|---|
| Adr2 | Len2 |
| Adr3 | Len3 |
| Adr4 | Len4 |
| Adr5 | Len5 |
| Adr6 | Len6 |
| Adr7 | Len7 |
| Adr8 | Len8 |
| Adr10 | Len10 |
| Adr20 | Len20 |
| Adr30 | Len30 |
| Adr40 | Len40 |
| Adr50 | Len50 |
| Cmd1 : PRINT-JOB START COMMAND | |
| Cmd2 : PRINT DATA FORMAT SETTING COMMAND | |
| Cmd3 : PAGE MARGIN SETTING COMMAND | |
| Cmd4 : PRINTING METHOD SETTING COMMAND | |
| Cmd5 : RESOLUTION SETTING COMMAND | |
| Cmd6 : IMAGING MODEL SETTING COMMAND | |
| Cmd7 : PRINT PREPARATION COMMAND | |
| Cmd8 : OTHER COMMAND | |
| Adr_Bk | Len_Bk |
| Adr_Y | Len_Y |
| Adr_M | Len_M |
| Adr_C | Len_C |
| Adr_m | Len_m |
| Adr_c | Len_c |
| Cmd_Bk : Bk COLOR SPECIFYING COMMAND | |
| Cmd_Y : Y COLOR SPECIFYING COMMAND | |
| Cmd_M : M COLOR SPECIFYING COMMAND | |
| Cmd_C : C COLOR SPECIFYING COMMAND | |
| Cmd_m : m COLOR SPECIFYING COMMAND | |
| Cmd_c : c COLOR IMAGING MODEL SETTING COMMAND | |
| Cmd20 : PRINT PAGE END COMMAND | |
| Cmd30 : PRINT JOB END COMMAND | |
| Cmd40 : MAINTENANCE 1 COMMAND | |
| Cmd50 : MAINTENANCE 2 COMMAND | |

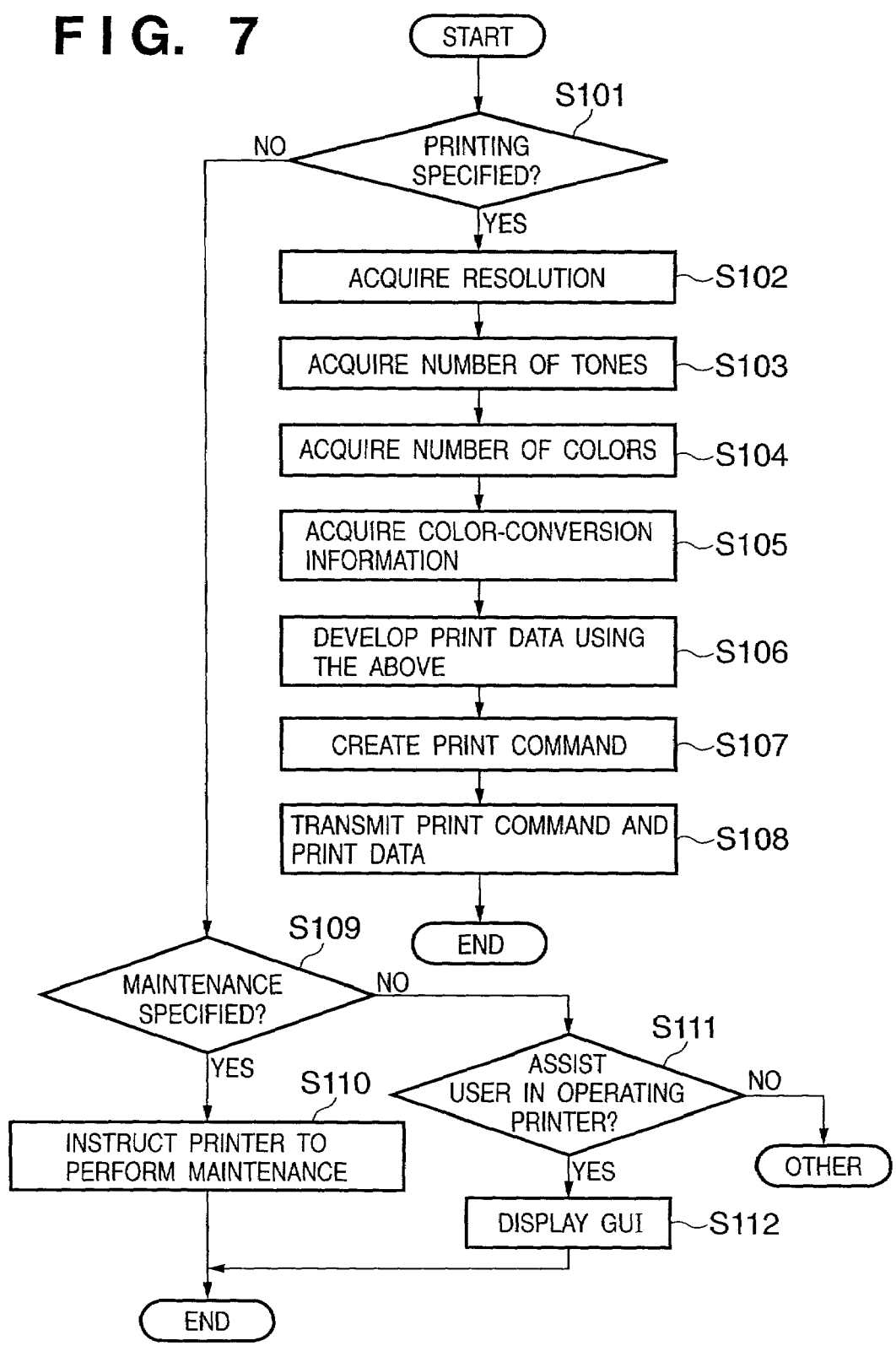

INFORMATION PROCESSING APPARATUS AND SYSTEM, INFORMATION PROCESSING METHOD AND DEVICE DRIVER

FIELD OF THE INVENTION

This invention relates to an information processing apparatus serving as a high-order (host) apparatus connected to a low-order (peripheral) apparatus so as to be capable of bidirectional communicating, and to an information processing system, method and device driver. Here the high-order apparatus includes, e.g., a host computer, a home information appliance such as a household television, a so-called set-top-box information terminal capable of being connected to a public network such as the Internet, or a game machine, and is capable of bidirectional communication via interface means with an input/output device such as a printer or scanner serving as the low-order apparatus.

BACKGROUND OF THE INVENTION

In a well-known system, a high-order apparatus such as a host computer and a low-order apparatus such as a scanner or printer are connected via a network or the like, and image data that has been read in from the scanner is processed and the processed data is printed by the printer.

Improvement in the performance of low-order apparatus such as printers and scanners has been pronounced in recent years. When a new function has been added to such a low-order apparatus, there are cases where a control command is added on anew in order to execute processing using this function. There are occasions where the user of such a system wishes to replace the older low-order apparatus with a low-order apparatus of better performance to which such a new function and control command have been added, and use this low-order apparatus in the same system.

If, e.g., a printer of higher performance is connected and used in such case, the printer driver installed in the high-order apparatus such as a host computer also must be changed in conformity with the printer. In order to accomplish this, usually a printer driver corresponding to the new model of the machine must be re-installed in the high-order apparatus and the printer driver for the new machine must me configured. No problems are encountered if the environment for the re-installation is such that the high-order apparatus has been connected to a public network such as the Internet and, if the new-model printer is found, the printer driver corresponding to this printer is installed automatically. However, in an instance where the high-order apparatus has not been connected to a LAN or network, it is necessary that the printer driver corresponding to this new model be re-installed in the high-order apparatus by the user. This is a troublesome operation for the user.

Further, in a case where it is desired that multiple models of printers be used by a single high-order apparatus, the printer drivers corresponding respective ones of these multiple models are installed and preserved on the, e.g., the hard disk of the high-order apparatus, and the drivers are switched among and used in accordance with the model of the printer to be used. This means that the memory capacity needed to store these drivers must be increased in comparison with the case where a single printer model is connected and used.

In a case where a printer is connected to a host computer, for example, the specification of Japanese Patent Application Laid-Open No. 7-137356 proposes to solve this problem by disclosing a printing system in which a host unit and a printer unit detachably connected. In the disclosed system, a plurality of command tables are stored in the printer RAM beforehand and the command tables of the printer RAM are updated by a command from the host side. This is to deal with a case where there are combinations in which the print commands differ from printer to printer or a case where only the version of the host computer is upgraded. Further, the specification of Japanese Patent Application Laid-Open No. 8-310059 discloses an arrangement in which control data conforming to model-number information of a printer is transmitted to the printer. This is for a case where, when the type and functions of a printer connected to a word processor are known in advance, the optimum control data is transmitted to the connected printer from the printer driver stored in the word processor.

However, the prior art disclosed in the above-mentioned publications cannot cope with a situation in which a new-model printer not anticipated by the host has been connected to the host.

Further, the specification of Japanese Patent Application Laid-Open No. 9-272233 discloses an arrangement in which a high-order apparatus stores the printer drivers of a plurality of printers beforehand and print processing is executed upon selecting a printer driver that conforms to the model of the printer that is to perform the printing. However, this requires that a plurality of printer drivers be stored in the high-order apparatus, as a result of which a very large memory capacity is needed to store the drivers. In addition, as in the case described above, the disclosed arrangement cannot cope with a new-model printer not originally anticipated and a new printer command cannot be added on.

Furthermore, the specification of Japanese Patent Application Laid-Open No. 11-227181 discloses a printer in which printing can be performed upon mounting printheads of different types without changing the printer hardware. In accordance with this arrangement, the controller of the printer on which printheads of different types can be mounted interchangeably transmits data representing the characteristics of the mounted printhead to a host processor, and the controller supplements the print information with profile information concerning the mounted printhead. However, this publication is silent on resolution information concerning the print data, information relating to number of tones, information relating to number of colors used, control-conversion information, print-control command information, print-size information, media-type information, information concerning means for detecting amount of remaining ink, mechanical-mechanism information and operation-assist information, and how these items of information are dealt with is not clear. Further, the host processor in this publication reads information from the printer and stores it as a printer driver in advance in dependence upon this data. The host processor selects a plurality of printhead drive parameters and transmits them to the printer. In this case also, therefore, it is required that the host processor store beforehand parameters corresponding to a printhead to be used. If a new printer is to be added on, it becomes necessary to added on a printer driver that conforms to this printer.

Further, the invention described in the specification of Japanese Patent Application Laid-Open No. 10-226140 relates to an image forming apparatus for forming an image based upon data sent from an external device. This publication proposes that the image forming apparatus store all or a part of a control program of the image forming apparatus that the external device uses. According to this invention, however, the selection of the printer is made in response to an indication from the user, and therefore a malfunction will occur if the user selects the incorrect printer. Further, in the case of an external device that involves difficulty regarding the designation of a selection from the user, as in the manner of a set-top-box information terminal that is one type of home information appliance, selection of a printer will not be possible. In addition, in a case where a control program has been created without limitation, e.g., in a case where the area of a working RAM in an external device has been exceeded, a situation may arise in which control cannot be carried out by the external device. With a printer in which no limitation is placed upon the type of high-order apparatus, there are many cases where limitations on the useable area of a working RAM and other restrictions are imposed depending upon the type of high-order apparatus. If this storage area is exceeded, normal operation cannot be carried out.

Further, in a case where part of a control program is stored in a printer, problems arise in terms of compatibility between this program and a control program that has been stored in the high-order apparatus.

Thus, with conventional systems, it is required that the high-order apparatus on the host side previously store the drivers of low-order apparatus, e.g., printers and scanners, the future use of which is predicted. This means that part of the storage area of the high-order apparatus must always be set aside as a storage area for drivers or the like regardless of whether these low-order apparatus are used or not. Further, in a case where use is made of a printer or scanner of a newly developed model, it is necessary that this driver must be installed in the high-order apparatus.

Further, in the case of a game machine, which is not equipped with a large-capacity rewritable memory device such as a hard disk or flash memory, thereby requiring that the host control program inclusive of a scanner driver or printer driver must be stored in read-only memory means such as a ROM, CD-ROM or DVD-ROM, the conventional high-order apparatus is such that the version of driver corresponding to a low-order apparatus of a new model cannot be upgraded and it is not possible to deal with a low-order apparatus of another model type.

SUMMARY OF THE INVENTION

Accordingly, an object of the present invention is to provide an information processing apparatus, system, a method of processing information and a device driver through which low-order (peripheral) devices having different control commands can be controlled without changing the control program of a high-order (host) apparatus or by using a control program of one type.

Another object of the present invention is to provide an information processing apparatus, system, a method of processing information and a device driver which prevent malfunction of a peripheral device due to incompatibility between a control command based upon a control program installed in the high-order apparatus to control the peripheral device and a control command of this peripheral device.

A further object of the present invention is to provide an information processing apparatus, system, a method of processing information and a device driver through which, even if a device driver installed in a high-order apparatus to control a peripheral device has been stored in a read-only memory, it is possible to control peripheral devices of multiple types having control commands that differ from one another.

In order to attain the objects, an information processing apparatus of the present invention comprises the following structure. An information processing system in which a high-order apparatus and a low-order apparatus are connected so as to be capable of bidirectional communication, wherein the low-order apparatus stores control command information of the low-order apparatus and transmits the control command information to the high-order apparatus in response to a command from the high-order apparatus; and the high-order apparatus controls the low-order apparatus using the control command information.

In order to attain the objects, an information processing apparatus of the present invention comprises the following structure. An information processing apparatus for controlling a low-order apparatus under the control of a control program, comprises requesting means for requesting the low-order apparatus for control command information of the low-order apparatus; receiving means for receiving the control command information transmitted from the low-order apparatus in response to the request from the requesting means; and control means for controlling the low-order apparatus using the control command information received by the receiving means.

In order to attain the objects, a device driver of the present invention comprises the following steps. A device driver, which is stored in a high-order apparatus, for controlling a low-order apparatus connected to the high-order apparatus, the device driver comprises: a requesting step of requesting the low-order apparatus for command control information of the low-order apparatus; a storage step of receiving and storing in a memory the control command information transmitted from the low-order apparatus in response to the request at the requesting step; and a control step of controlling the low-order apparatus based upon the control command information that has been stored in the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 6 is a diagram useful in describing the details of print-control command information according to this embodiment;

FIG. 7 is a flowchart useful in describing processing by a printer driver according to this embodiment;

DESCRIPTION OF THE PREFERRED EMBODIMENTS

Preferred embodiments of the present invention will now be described in detail with reference to the accompanying drawings.

According to these embodiments, a system for sending and receiving data between a high-order apparatus and low-order apparatus is described as an example of a system in which a high-order apparatus such as a host computer and a low-order apparatus such as a printer or scanner are connected.

First Embodiment

Figure 1:
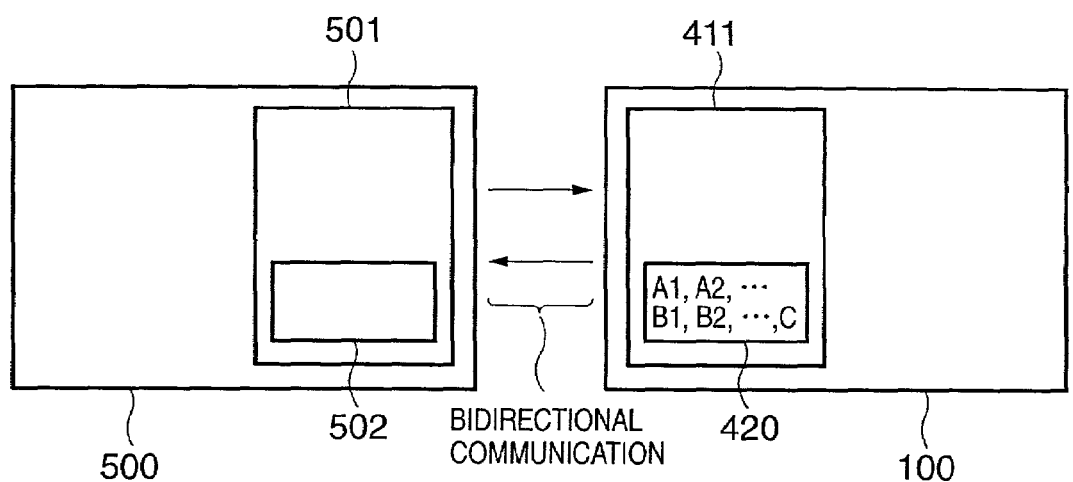
FIG. 1 is a block diagram illustrating the configuration of a printing system according to a first embodiment of the present invention.

FIG. 1 is a block diagram illustrating the configuration of a printing system in which a host computer 500 serving as a high-order apparatus and a printer 100 serving as a low-order apparatus are connected.

As shown in FIG. 1, the host computer 500 includes a printer driver 501 that is stored within the host computer 500 in the form of software. It should be noted that the printer driver 501 may be stored on a storage medium such as a ROM installed in the host computer 500. Model-specific information 502 holds parameters and commands classified by model corresponding to each model of printer that may be connected. In order to simplify the description, the arrangement is such that parameters and control commands classified by model have been stored collectively in one location of the model-specific information 502. However, this does not impose a limitation upon the invention. In order to raise the efficiency of processing executed by the printer driver 501, an arrangement may be adopted in which the parameters and commands are stored in dispersed fashion in multiple locations of the printer driver 501, or in which these parameters and commands are stored in another memory area.

The printer 100 has a ROM 411 provided with model-specific information 420 already holding parameters and control command corresponding to models of the printer 100. Stored in the model-specific information 420 are various parameters, which are indicated by A1, A2, . . . , B1, B2, . . . , and a control command (C). These will be described in detail later. In order to simplify the description, the arrangement is such that these parameters and control commands classified by model also have been stored collectively in one location of the ROM 411. However, this does not impose a limitation upon the invention. In order to use the ROM 411 efficiently, or in order to access the ROM 411 more easily, the parameters and commands may be stored in dispersed fashion in multiple locations.

The host computer 500 and printer 100 may be connected via a USB cable, by way of example. If the connection has a bidirectional communication capability, any form of connection will suffice. In addition, communication may be via another interface and may be wireless.

Figure 2:
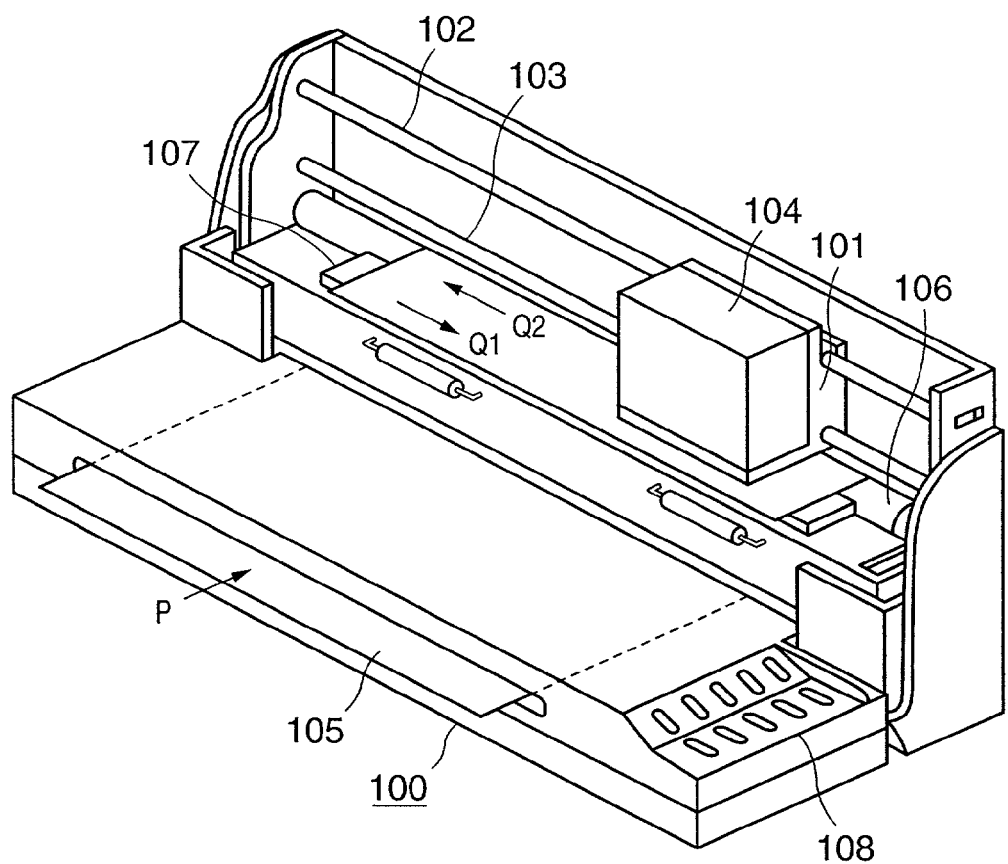
FIG. 2 is an external perspective view showing a printer according to this embodiment.

FIG. 2 is an external perspective view showing the structure of the printer 100 according to this embodiment.

As shown in FIG. 2, a printing medium (recording sheet or the like) 105 that has been inserted at a paper feed position of the printer 100 is fed in the direction of arrow P by rotation of a feed roller 106 and is transported to an area in which printing can be performed by a printhead 104. A platen 107 is provided beneath the printing medium 105 in the printing area. The printhead 104 is mounted on a carriage 101. The latter is capable of being moved back and forth by two guide shafts 102 and 103 along the direction of these shafts. As a result, the printhead 104 scans the print area back and forth in directions Q1 and Q2, namely the horizontal-scan direction.

The printhead 104 includes orifices capable of ejecting inks of a plurality of colors, and an ink tank capable of accommodating inks of a plurality of colors. The ink orifices of the printhead 104 point downward. The inks in the printer 100 are of four colors, namely Bk (black), C (cyan), M (magenta) and Y (yellow).

The printer includes a control panel 108 having a switch unit and a display unit. The switch unit is used to turn the power supply of the printer 100 on and off and to set various printing modes. The display unit is used to display the status of the printer 100.

Figure 3:
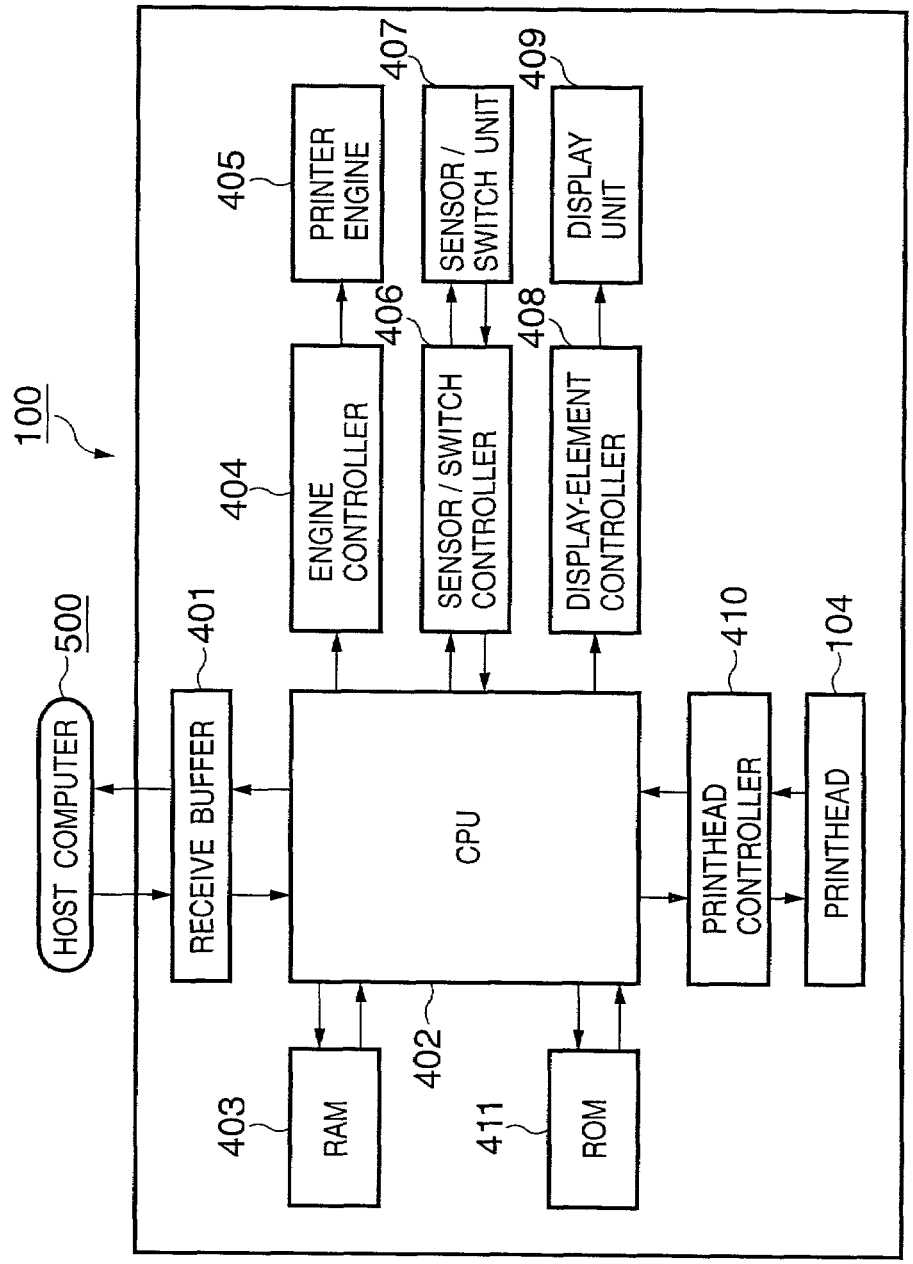
FIG. 3 is a block diagram illustrating the structure of a printer according to an embodiment of the present invention.

FIG. 3 is a block diagram illustrating the structure of the printer 100 according to this embodiment.

If print data including character or image data to be printed sent from the host computer 500 is received by the printer 100, the received data is input to and held in a receive buffer 401. Further, model-specific data that has been stored in the ROM 401 of printer 100, data for confirming whether data has been transferred correctly from the host computer 500 to the printer 100, and data for reporting the operating status of the printer 100 is transmitted from the printer 100 to the host computer 500.

Data that has been stored in the receive buffer 401 is transferred to a RAM 403 under the control of a CPU 402 and is stored in the RAM 403 temporarily. The ROM 411 stores a control program executed by the CPU 402, various initial-setting parameters, as well as model-specific parameters and control commands of the printer 100. In response to a command from the CPU 402, an engine controller 404 drives and controls a printer engine 405 having mechanical portions such as a carriage motor and paper-feed motor.

A sensor/switch controller 406 sends the CPU 402 signals from various sensors and from a sensor/switch unit 407 that includes the switches of the control panel 108. In response to a command from the CPU 402, a display-element controller 408 drives LEDs on the control panel 108 and a display unit 409 having liquid crystal display elements. A printhead controller 410 drives and controls the printhead 104 in accordance with a command from the CPU 402. The printhead controller 410 senses, e.g., the temperature of the printhead 104, which is indicative of the status of the printhead 104, and sends this signal to the CPU 402. In response, the CPU 402 drives and controls the printhead 104 based upon the temperature information.

Figure 4:
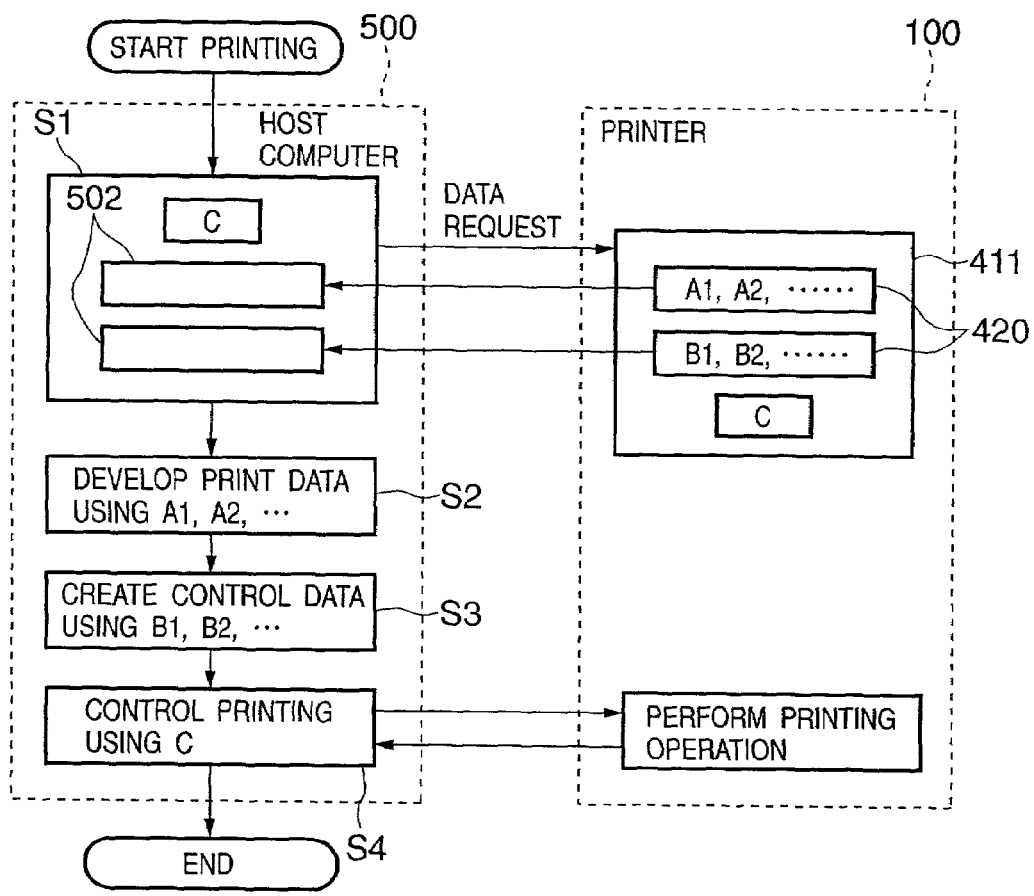
FIG. 4 shows a block diagram useful in describing processing according to the first embodiment of the present invention, as well as a flowchart of this processing.

FIG. 4 is a flowchart illustrating the concept of a printing operation performed by the printing system according to this embodiment. In FIG. 4, control processing in the host computer 500 is illustrated separate from control processing in the printer 100.

When a printing operation starts in the host computer 500, the latter sends a predetermined control command to the printer 100 at step S1 to request transfer of model-specific information from the printer 100. In response, the printer 100 sends the host computer 500 parameters A1, A2, ..., B1, B2, ... and the control command C of the model-specific information 420 stored in ROM 411 of the printer 100. The information thus transmitted is stored in the model-specific information 502 of the printer driver 501 of host computer 500.

Next, at step S2, the host computer 500 uses the model-specific parameters A1, A2, ... received from the printer 100 to develop print data to be transmitted to the printer 100. The information indicated below in the printer 100 has been set in the model-specific parameters A1, A2, ..., and the host computer 500 uses this information to generate print data to be transmitted to the printer 100.

A1: resolution information
A2: number-of-tones information
A3: information concerning number of colors used
A4: color-conversion information The resolution information (A1) indicates the resolution of an image capable of being printed by the printer 100. Here it is assumed that resolution is 600 dpi in the horizontal-scan scan direction and 600 dpi in the vertical-scan direction, by way of example. The printer driver 501 is adapted beforehand so as to be able to support other horizontal scan x vertical scan resolutions as well, examples of such resolutions (in dpi) being 180×180, 360×180, 360×360, 720×360 and 720×720, or 150×150, 300×150, 300×300, 600×300 and 600×600. The printer driver 501 can be adapted to support other sets of resolutions as well. Namely, the printer driver can be adapted to the resolution of under 2400 dpi. This restriction is determined in consideration of a resource (e.g. capacity of a memory or OS) in a host computer. However, the present invention can not be limited by the restriction of the resource of the host computer in which the printer driver is installed has sufficient capacity.

The image resolution of print data rendered in the host computer 500 is decided based upon the resolution information (A1). It will be assumed here that a resolution of "600" in the horizontal-scan direction and "600" in the vertical-scan direction has been designated as the model-specific parameter of printer 100. It should be noted that the resolution information (A1) has been stored in the ROM 411 of printer 100 as one byte in each of the horizontal- and vertical-scan directions.

Next, the number-of-tones information (A2) indicates the depth of image data corresponding to each resolution, where "1" is set in case of one bit, "2" in case of two bits and "4" in case of four bits. Since eight bits usually is sufficient for the number-of-tones information (A2), the printer driver 501 is capable of supporting up to eight bits, though the number of bits that can be supported can be set as appropriate. One byte of number-of-tones information (A2) has been stored in the ROM 411 of printer 100.

The information (A3) concerning the number of colors used is indicative of the four colors Bk, C, M and Y in this embodiment. Accordingly, A3="4" is transmitted from the printer 100. Other examples include the one color Bk, the three colors C, M and Y or the six colors obtained by adding light C and light M to the four colors of Bk, C, M and Y. The printer driver 501 therefore is adapted so as to be able to support one color, three colors, four colors and six colors. One byte of information (A3) concerning the number of colors used has been stored in the ROM 411 of printer 100. Further, eight colors obtained by adding light Bk and light Y to the six colors may be adapted.

The color-conversion information (A4) is a look-up table storing color-conversion information for deciding the gradation of each color of the colors Y, M, C, Bk. The look-up table is optimised by the type of printing medium (printing sheet) used in printing, the ink used, the maximum amount of ink that can be printed in a unit surface area of the printing medium and the image of the desired gradation. For example, if the ink used has been improved and results in a change in the coloration produced on the printing medium used, then it becomes necessary to change the look-up table. Though the type of printing medium may be changed, here this is dealt with by transferring the look-up table constituting the color-conversion information (A4). Using the look-up table sent from the printer 100, the host computer 500 executes processing to expand RGB to data of Bk, C, M and Y. The color-conversion information (A4) has been stored in the ROM 411 of printer 100 in an amount equivalent to 64 KB.

Next, at step S3, the host computer 500 uses the model-specific parameters B1, B2, ... received from the printer 100 to create print data to be transmitted to the printer 100. The information indicated below in the printer 100 has been set in the model-specific parameters B1, B2, ..., and the host computer 500 uses this information to generate print data to be transmitted to the printer 100.

B1: print-size information
B2: media (printing media)-type information
B3: printhead maintenance data
B4: printhead structure data
B5: information relating to means for sensing amount of remaining ink
B6: mechanical-mechanism information
B7: operation-assist information The model-specific parameters B1, B2, ... and the processing of step S1 are combined to create control data and print data to be sent from the host computer 500 to the printer 100.

The print-size information (B1) is information relating to printable width of the printer 100 in the horizontal- and vertical-scan directions. On the basis of the information (B1), print data is generated within the host computer 500 so as to fit within the printable size of the printer 100. This data is then sent to the printer 100. Here the printable width is 8 inches horizontally and 10 inches vertically. The print-size information (B1) is used when printing is performed in accordance with a center reference and has been stored as two bytes in the ROM 411 of the printer 100.

The media-type information (B2) is information indicating the type of printing medium used in printing, such as whether the medium is plain paper or glossy film, etc. There are cases where the printing-medium transport conditions in the printer 100 are changed depending upon this information. Here it is assumed that the printing-medium type information is indicative of plain paper. The printing-medium type information has been stored as one byte in the ROM 411 of printer 100.

The printhead maintenance information (B3) stipulates information relating to maintenance of the printhead 104, examples of this information being the number of times ink is preliminary discharged from the printhead 104 immediately prior to print processing, and the time intervals at which the printhead 104 performs a suction operation. Here it is assumed that the number of preliminary ink discharges is "100" and that the time intervals at which the printhead 104 perform the suction operation is "5 min". A maximum of four bytes of the printhead maintenance information (B3) have been stored in the ROM 411 of the printer 100. The timing at which the printer is subjected to maintenance can be specified based upon this maintenance information.

The printhead structure information (B4) is information relating to the structure of the printhead 104 in printer 100. If the numbers of nozzles are the same for each of the colors Bk, C, M and Y and the four colors are arrayed at the same positions in the vertical-scan direction, then the information (B4) in this case will be "0, 0, 0, 0". Further, if the numbers of nozzles are the same for each of the colors Bk, C, M and Y of the printhead 104 and the rows of nozzles of the respective colors are arrayed in staggered fashion every 100 nozzles in the vertical-scan direction in the order of Bk, C, M, Y, then this information will be "0, 100, 200, 300". This is referred to when print data that has been made to conform to the nozzles of each color is transferred. As a result, the memory capacity needed to store the print data can be reduced in the printer 100. The printer driver 501 is adapted so as to be capable of supporting these numerical values. Four bytes of the printhead structure information (B4) have been stored in the ROM 411 of the printer 100.

The information (B5) relating to means for sensing amount of remaining ink is information indicating what means the printer 100 possesses as means for sensing the amount of ink remaining in the printhead 104. For example, if the printer 100 does not have means for sensing the remaining amount of ink, than this information is "0". If the printer 100 does have such means, then the number of steps in which this is performed is indicated by a numeral. For example, this is represented by numeral corresponding to 3 steps, 5 steps, . . . , 100 steps. In this embodiment, the information is set to "0" because the printer 100 does not possess means for sensing the remaining amount of ink. It is assumed that the printer driver 501 has been set by this information beforehand with regard to how the result of sensing the remaining amount of ink is to be displayed on the display screen of the host computer 500. One byte of the information (B5) relating to means for sensing amount of remaining ink has been stored in the ROM 411 of printer 100.

The mechanical-mechanism information (B6) is information relating to the printer engine 405 of the printer 100. This information concerns the mechanism of the printer engine 405, e.g., whether the printer engine 405 is an ink-jet printing unit or thermal-transfer printing unit.

The operation-assist information (B7) is information for allowing the user to specify, from the host computer 500, operation relating to the printer 100. This is information utilized on the display unit 409 of the control panel 108 to describe functions and operations specific to the model of the printer 100. The information (B7), which concerns the printing function of the printer 100, is an auxiliary database displayed on an operating screen so that the user can enter commands as by a graphical user interface. For example, this information is text, icon images, an image representing the external form of the printer 100 or control panel thereof, or operation control information for controlling the operating screen. The information (B7) can be utilized by the host computer 500 upon being acquired from the printer 100 as necessary. As a result, it is possible to provide a user-friendly operating environment in which an operation relating to the connected printer 100 or on-line help, for example, can be specified, and in which optimum explanatory text and images are displayed for the user. Here 32 KB of the operation-assist information (B7) have been stored in the ROM 411 of printer 100.

Next, at step S4, using the control command received from the printer 100, the host computer 500 controls the printing operation and transmits control data and print data to the printer 100 so that an ordinary printing operation is performed.

The print-control command information (C) is information relating to a control command for outputting a desired image from the host computer 500 to the printer 100. This information defines a control command sequence for making various mode settings and for executing printing control in line with the purpose of printing. By controlling the printer 100 based upon the print-control command information, the printer 100 can be made to perform printing using a control command best suited to this printing operation. Data of the kind shown in FIG. 6, for example, has been stored in the print-control command information.

In FIG. 6, Adr1, Len1 to Adr50, Len50 represent management information, in which AdrN is an offset address value wherein the beginning of the print-control command information serves as a reference and the read-out position of command data CmdN is indicated by 16 bits. Further, LenN represents the amount of data in the command data CmdN, in which the number of bytes thereof is represented by 16 bits. In other words, at the start of a print job of command data Cmd1 (a print-job start command), the storage location of a control command sequence (print-job start command) to be transmitted to the printer 100 is indicated by Adr1, and the amount of data in this control command sequence can be identified by Len1. Similarly, the storage location and amount of data of a "print data format setting command" Cmd2, which sets whether print data is to be compressed or not, are specified by Adr2, Len2. Further, the storage location and amount of data of a "page margin setting command" Cmd3, which sets page margins (left and right margins, etc.) conforming to the type of printing medium used in printing, are specified by Adr3, Len3. Likewise, the storage location and amount of data of a "printing method setting command" Cmd4, which sets color or monochrome printing, type of printing medium and printing quality, are specified by Adr4, Len4; the storage location and amount of data of a "resolution setting command" Cmd5, which sets printing resolution, are specified by Adr5, Len5; the storage location and amount of data of an "imaging model setting command" Cmd6, which sets number of ones of each color and the selection of ink, are specified by Adr6, Len6; the storage location and amount of data of a "print preparation command" Cmd7, which performs maintenance such as cleaning of the printhead 104 before the onset of printing, are specified by Adr7, Len7; and the storage location and amount of data of an "other settings command" Cmd8, which is used in a case where it is necessary to make a setting before the start of another printing job, are specified.

As a result of the foregoing, the host computer 500 reads out the respective corresponding command data at the time of printing control and can transmit this data to the printer 100.

Another possible method is to store the command data Cmd1 to Cmd8 collectively as a single assemblage of control command sequences. In such case, Adr1 would be adopted as an offset address value representing the beginning of the storage location of a control command sequence of interest, and the total number of bytes of the control command sequence would be inserted into Len1. In this case, the management information Adr2, Len2 to Adr8, Len8 would be unnecessary.

The above-mentioned control command is output from the host computer 500 to the printer 100 when a printing job is started following the setting of the printing mode.

Next, it is necessary to add a color specifying command onto the image data of every color to be printed. Accordingly, it is so arranged that Adr_Bk, Len_Bk to Adr_c, Len_c are read out by Adr10, Len10, and so that color-specifying command data indicated by Cmd_Bk to Cmd_c can be read out based upon the content thereof.

More specifically, Adr_Bk represents an offset address value of the storage location of a "Bk (black) color specifying command", and Len_Bk represents the amount of data in this command. Similarly, Adr_Y, Len_Y indicate the offset address value of the storage location, and the amount of data, of a "Y (yellow) color specifying command". Likewise, Adr_M, Len_M indicate the offset address value of the storage location, and the amount of data, of an "M (magenta) color specifying command"; Adr_C, Len_C indicate the offset address value of the storage location, and the amount of data, of a "C (cyan) color specifying command"; Adr_m, Len_m indicate the offset address value of the storage location, and the amount of data, of an "m (light magenta) color specifying command"; and Adr_c, Len_C indicate the offset address value of the storage location, and the amount of data, of an "c (light cyan) color specifying command".

It should be noted that in a case where the printhead 104 of the printer 100 is capable of printing using inks of the four colors Bk, Y, M and C, for example, the information concerning Cmd_m and Cmd_c is unnecessary. In such case, the set values of Len_m and Len_c would be "0". Similarly, in a case where the printhead 104 is capable of printing using inks of the three colors Y, M, C, the value of Len_Bk would be set to "0".

Next, when the printing of one page ends, the offset address value of the storage location of a "print page end command" Cmd20, which the host computer 500 sends to the printer 100, is made Adr20 and the number of bytes thereof is recorded in Len20, whereby the host computer 500 is capable of reading out and transmitting the "print page end command" Cmd20 corresponding to the printer 100.

Further, when one printing job ends, the offset address value of the storage location of a "print job end command" Cmd30 to be sent to the printer 100 is made Adr30 and the number of bytes thereof is recorded in Len30, whereby the host computer 500 is capable of reading out and transmitting the "print job end command" Cmd30 corresponding to the printer 100.

Furthermore, in order to so arrange it that the printer 100 can be instructed to reliably implement a maintenance function such as the cleaning of the printhead 104, two types of maintenance commands, namely a "Maintenance 1 command" Cmd40 and a "Maintenance 2 command" Cmd 50 are prepared, the address offset values of the storage locations of these control commands are stored at Adr40 and Adr50, respectively, and the numbers of bytes indicating the respective amounts of data are stored at Len40 and Len50, respectively.

By adopting the arrangement described above, it is unnecessary to change the printer driver 501 in the host computer 500 even if the printer 100 is replaced by a new-model printer and the printer control command thereof is changed or a new one added on. This makes it possible to execute print processing in conformity with the new printer.

In the first embodiment, a case in which only a control command of the printer 100 is dealt with in the host computer 500 is described. However, this does not impose a limitation upon the present invention. For example, it is possible to adopt an arrangement in which the printer driver 501 is one which anticipates functions that will be supportable in the future, the control command sequence conforming thereto is stored in each printer in advance, the data of this control command is read out of the printer 100 and stored in the host computer 500 by the printer driver 501 of the host computer 500, print data is created by the host computer 500 based upon this stored data and is output to the printer 100. Alternatively, an area for storing the control command can be reserved in the printer driver 501, a new command sequence can be read in from the printer 100 and this data can be transmitted to the printer 100, thereby providing the potential for more flexible development.

Figure 5:
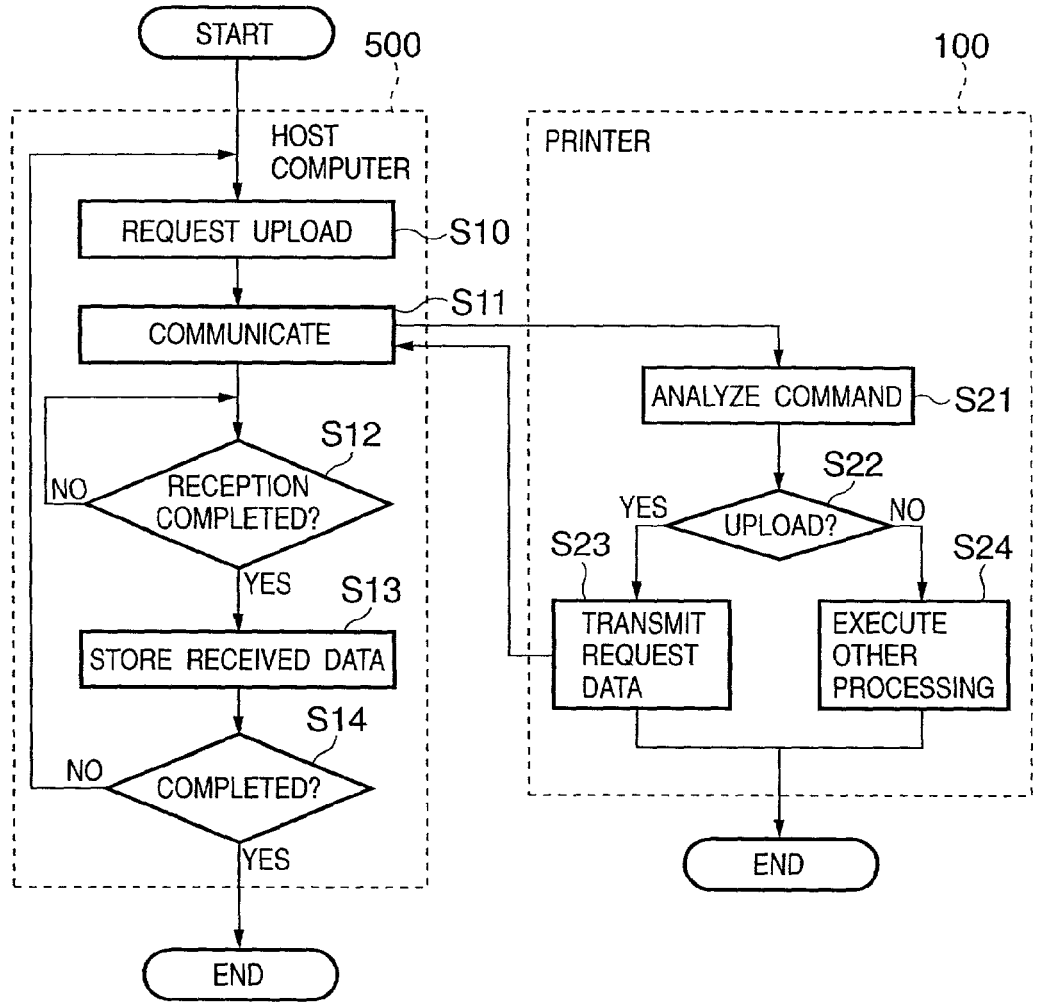
FIG. 5 is a flowchart showing the details of processing for transferring model-specific information in a printer according to this embodiment of the invention.

FIG. 5 is a flowchart showing the details of processing for transmitting model-specific information at step S1 in FIG. 4. This describes the details of communication protocol between the host computer 500 and printer 100 according to this embodiment. This processing is executed in the host computer 500 when it is necessary to read model-specific information out of the printer 100.

First, at step S10, the host computer 500 transmits an upload request command for various information to the printer 100 via an interface in order to acquire desired model-specific information from the printer 100. The status of communication is indicated at step S11. Next, at step S12, the host computer 500 waits for receipt of the information from the printer 100 in response to the request command. It is so arranged that the model-specific information desired by the host computer 500 can be specified by the upload request command.

The processing executed by the printer 100 that has received the upload request command will now be described. When the printer 100 receives a control command from the host computer 500 via the interface, the printer analyzes the command at step S21. This is followed by step S22, at which the printer checks to see whether the received command is an upload request command. If the command is other than an upload request command, e.g., a command for other processing such as a print control command, then control proceeds to step S24 and the corresponding processing is executed. If it is found at step S22 that the command is an upload request command, then control proceeds to step S23, at which the printer reads out the model-specific information requested by the host computer 500 and transmits this information to the host computer 500 via the interface. If the processing of step S23 or S24 ends, then processing executed by the printer 100 to receive the control command is exited.

Thus, when the host computer 500 receives answer data from the printer 100, control proceeds from step S12 to step S13, the received data is stored in the memory of the host computer 500 and is preserved so that it can be utilized in the control program run later. Next, at step S14, the host computer 500 determines whether there is additional data desired to be uploaded from the printer 100. If there is such data, then control returns to step S10 and the above-described processing is executed to repeat the processing routine. If all of the necessary model-specific information has thus been acquired from the printer 100, then the loop of step S14 is exited and processing ends.

Thus, immediately after the start of print processing in the host computer 500, the type of printer 100 used in printing and the model-specific information conforming to the printing mode are acquired from the printer 100 and the host computer 500 utilizes this information to execute processing for developing the print data and then transmitting the print data. As a result, even if the capabilities of the printer 100, such as its resolution, tonality or ink coloration characteristics, change, or even if the control command of the printer 100 changes, the generation of print data and printing control conforming to the printer 100 can be performed without changing the printer driver 501 in the host computer 500.

Reference will be had to the flowchart of FIG. 7 to describe an overview of processing executed by the printer driver 501 of the host computer 500 according to this embodiment.

FIG. 7 is a flowchart illustrating processing in the printer driver 501 of host computer 500 for acquiring various information from the printer 100 and creating a print command and print data transmitted to the printer 100 (this corresponds to the processing of steps S2 to S4 in FIG. 4).

If the start of print processing is specified from an application program or the like at step S101, control proceeds to steps S102, S103, S104 and S105, at which the printer driver 501 acquires the printer resolution, number of tones, number of printable colors and color-conversion information, etc., from the model-specific information acquired at step S1 of FIG. 4. On the basis of this information, the printer driver 501 develops the print data (step S106) in accordance with image data specified from the application program.

Next, at step S107, the printer driver 501 creates a print command, which is transmitted to the printer 100, based upon print-control command information, print-size information, printing-medium type information and printhead structure information contained in the model-specific information acquired from printer 100. The generated print command and print data are transmitted from the host computer 500 to the printer 100 at step S108.

If start of printing is not designated at step S101, then control proceeds to step S109, at which the printer driver 501 determines whether maintenance of the printhead 104 of printer 100 has been designated. If maintenance has been designated, then control proceeds to step S110, at which the printer driver 501 instructs the printer 100 to perform a maintenance operation such as cleaning of the printhead 104. If maintenance is not designated at step S109, then control proceeds to step S111, at which the printer driver 501 determines whether to instruct the printer 100 to implement an assist function for the purpose of describing operation of the printer. If operation assist has been designated, control proceeds to step S112, at which the printer driver 501 causes the model-specific functions and a description of operation of the printer 100 to be displayed on the display screen of the host computer 500 as by a graphical user interface (GUI).

Figure 8:
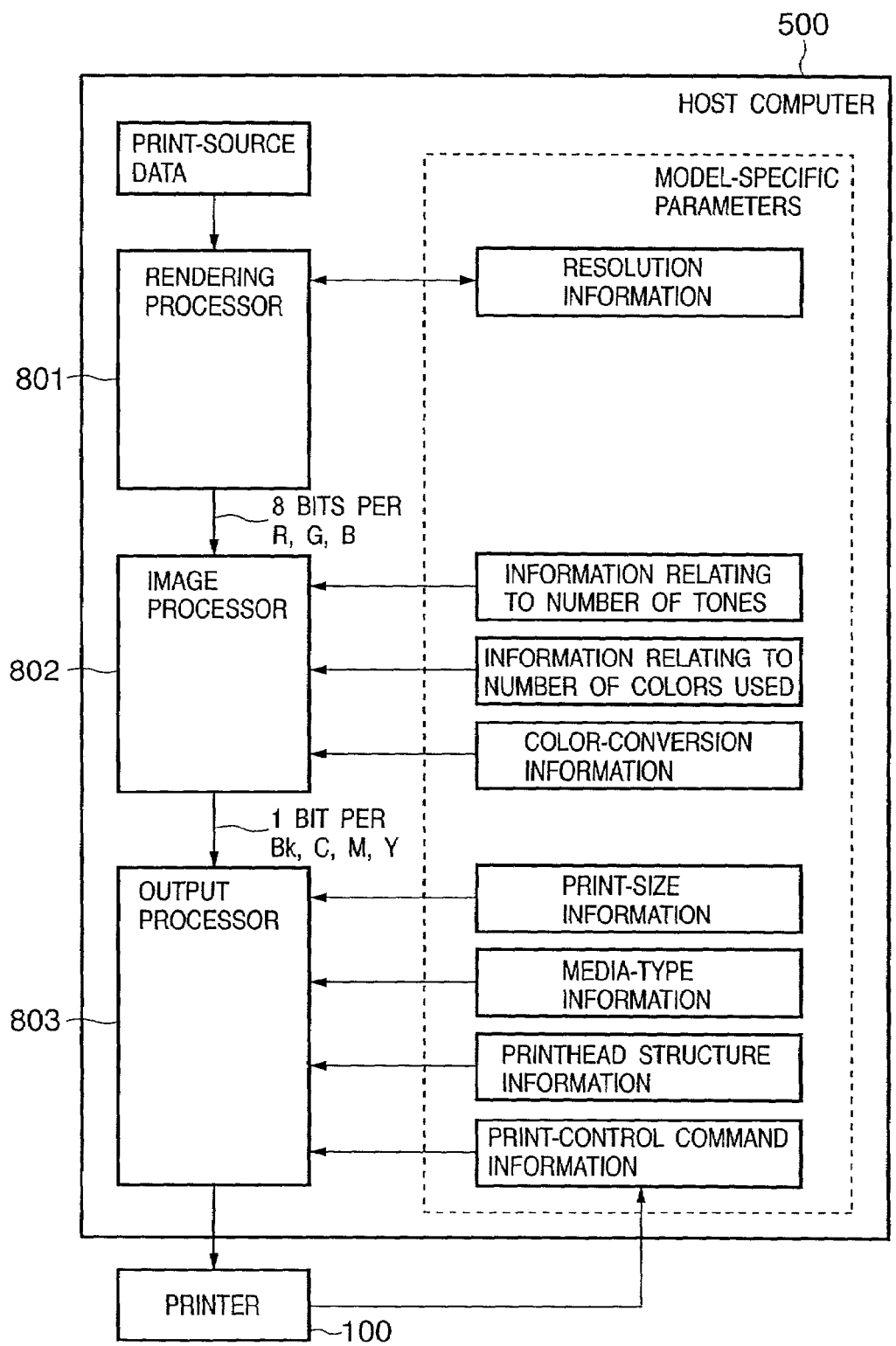
FIG. 8 is a block diagram illustrating the functional structure of a printer driver according to this embodiment.

FIG. 8 is a block diagram illustrating the functional construction of the printer driver 501.

As shown in FIG. 8, the printer driver 501 includes a rendering processor 801 for rendering characters and raw-image data, which is desired to be printed, based upon resolution information contained in the model-specific information. In the example set forth above, the resolution information contained in the model-specific information is "600×600". Accordingly, rendering is performed at a resolution of 600 dpi in the horizontal-scan direction and 600 dpi in the vertical-scan direction. As a result, 8-bit data for each of R, G, B is obtained at the resolution of 600 dpi×600 dpi. The resolution of the data obtained here is dependent upon the model-specific information.

An image processor 802 subjects the 8-bit data for each of R, G, B to image processing based upon information contained in the model-specific information, namely information relating to the number of tones, information relating to the number of colors used and color-conversion information. Here the information relating to number of tones uses one bit, the information relating to number of colors used uses four colors, and the color-conversion information uses a look-up table for converting RGB to BkCMY information. It should be noted that the image processor 802 also executes quantization processing.

Print data of one bit for each of Bk, C, M and Y is generated by executing this image processing. The print data thus generated is dependent upon the model-specific information. The processing thus far corresponds to the processing of steps S102 to S106 in FIG. 7.

On the basis of the print-size information, media-type information and printhead structure information contained in the model-specific information, an output processor 803 converts print data to a final-format print command, which is transmitted to the printer 100, in accordance with the print control command. This processing corresponds to the processing of step S107 in FIG. 7. The print command thus generated is transmitted to the printer 100. The final format of the print data is dependent upon the model-specific information.

Thus, under conditions in which functions of the printer driver 501 in host computer 500 serving as the high-order apparatus are fixed, the following hold:

(1) Even if a new-model printer of improved capabilities or a printer having different specification is connected, this can be dealt with without reinstalling the printer driver.

(2) Printers of multiple types having different capabilities can be controlled by a printer driver of a single type.

(3) Even if the printer driver has been stored on a read-only storage medium of the host computer, multiple printers of different types can be controlled.

The model-specific information described above is merely one example of such information and can be adapted to specifications of a broader range. Further, each item of model-specific information is independent. By combining these items of information, it is possible to deal with more complicated functions.

Second Embodiment

The configuration of a printing system according to a second embodiment of the present invention will now be described. In the second embodiment, the host computer 500 is additionally provided with a function for distinguishing the model of the connected printer 100.

Figure 9:
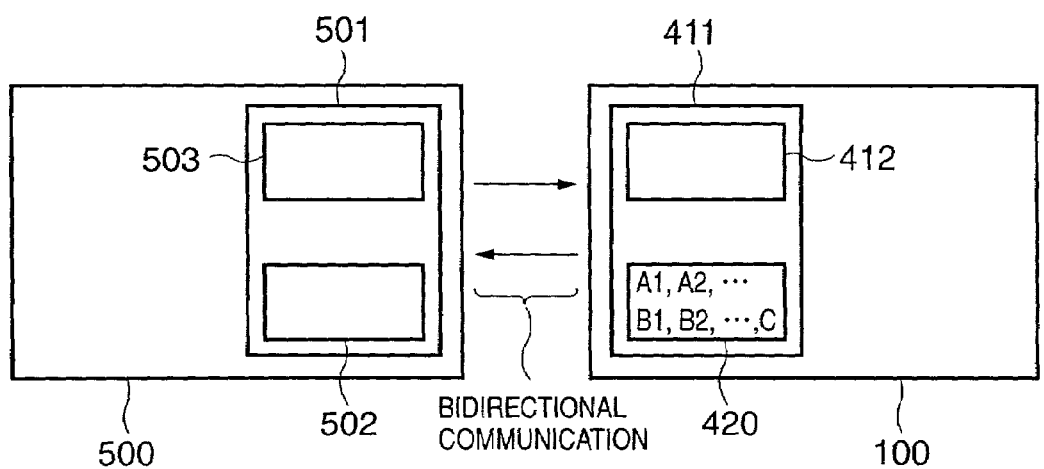
FIG. 9 is a block diagram illustrating the configuration of a printing system according to a second embodiment of the present invention.

FIG. 9 is a block diagram illustrating the configuration of a printing system according to the second embodiment of the invention, in which components identical with those shown in FIG. 1 are designated by like reference characters and need not be described again.

In the second embodiment, the host computer 500 has a model discriminating unit 503 for discriminating the model of the printer 100. Further, it is assumed that default parameters and a command have been prepared in the model-specific information 502 of the printer driver 501 as initial values. In addition, model distinguishing information 412 indicating the model of the printer 100 has been stored in the printer 100.

Figure 10:
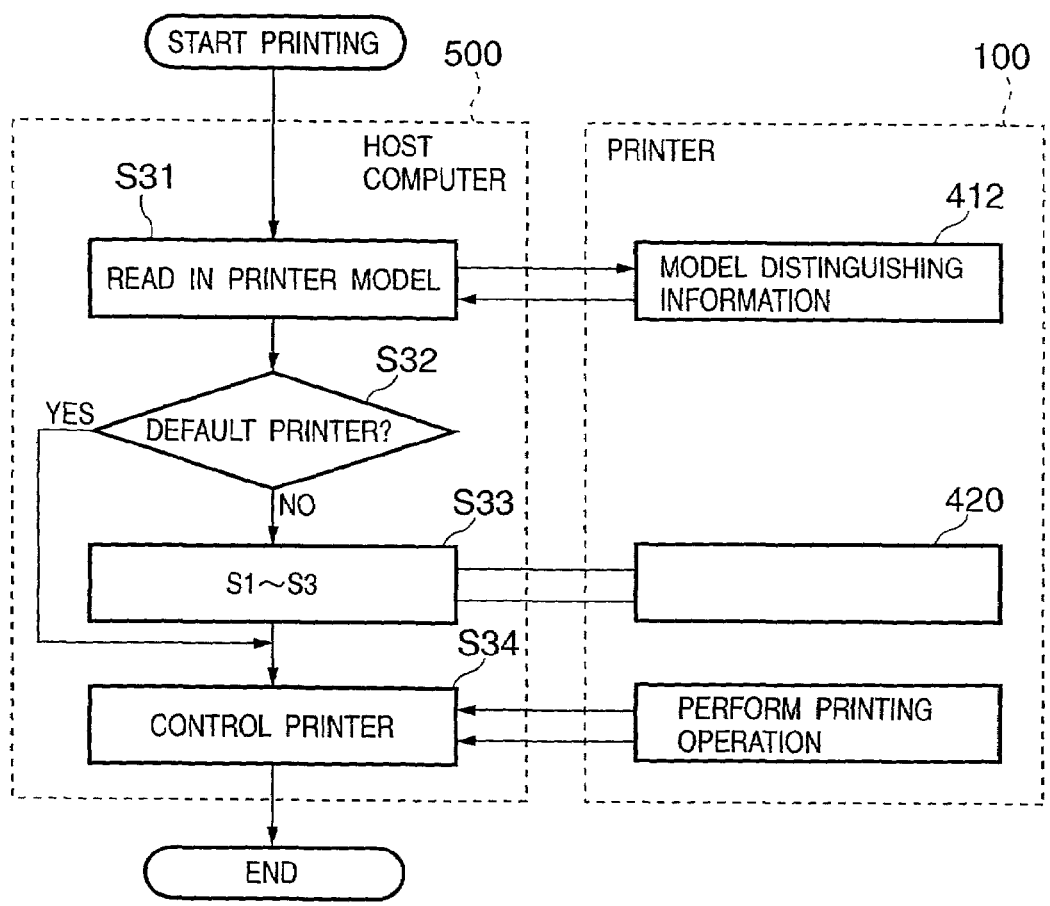
FIG. 10 is a flowchart illustrating the printing operation of a printing system according to a second embodiment.

FIG. 10 is a flowchart illustrating a printing operation performed in the printing system according to the second embodiment.

When the start of printing is ordered in the host computer 500, at step S1, the host computer 500 reads in the model distinguishing information 412 that has been stored in the printer 100. Next, at step S32, the host computer 500 discriminates the model of the connected printer 100 based upon the model distinguishing information 412 and determines whether the printer 100 is that of a model that has been set as a default. If the decision rendered is "YES", then control proceeds to step S34; if "NO", then control proceeds to step S33, at which the processing of steps S1 to S3 in FIG. 4 is executed to create a print command and print data. It should be noted that default model-specific information has been stored in the model discriminating unit 503 beforehand. This is followed by step S34, at which ordinary printing control is performed. This processing is then exited.

According to the second embodiment, since many models of the printer 100 have been set as defaults and there are many cases in which this suffices, predetermined model-specific information is stored in the host computer 500 beforehand as a default. As a result, in the case of a default printer, an operation for transmitting model-specific information from the printer to the host computer 500 is unnecessary and printing time can be shortened.

Furthermore, the foregoing is advantageous in that a printer whose model is a default need not have the model-specific information 420 in the ROM 411 of the printer. This makes it possible to reduce the ROM capacity of the ROM in the printer 100.

Third Embodiment

Described next will be a third embodiment in which the number of times model-specific information from the printer 100 is read in the host computer 500 is minimized.

Figure 11:
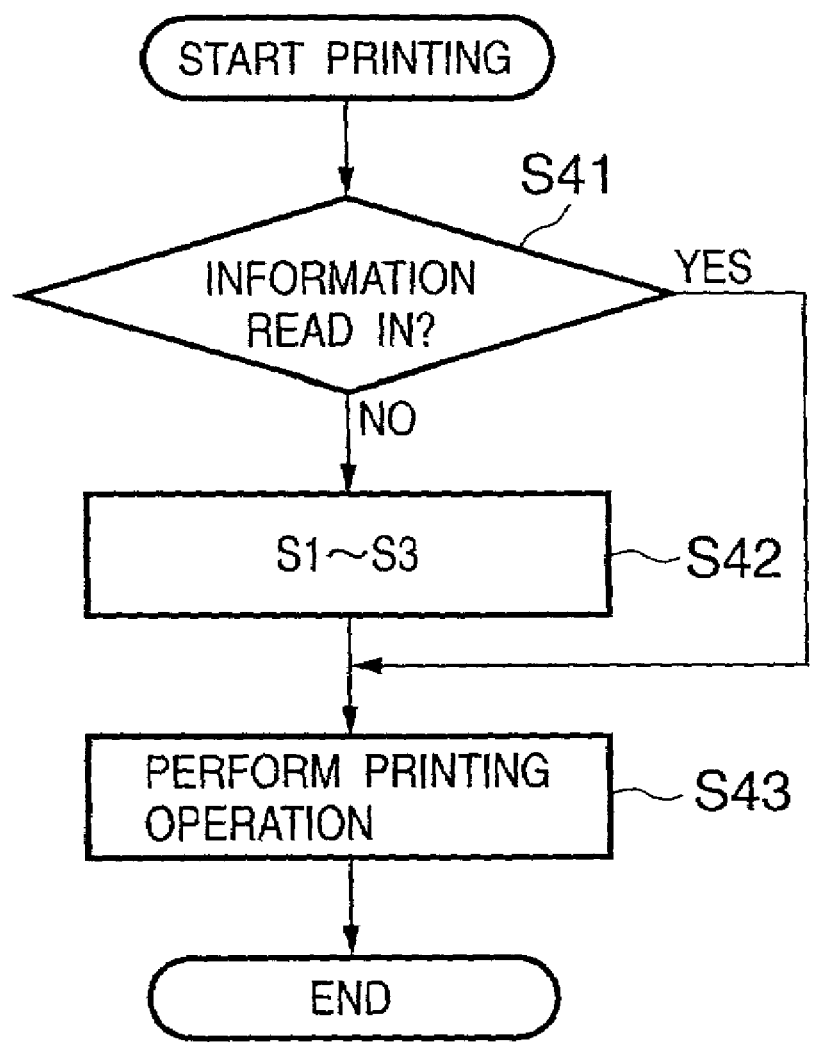
FIG. 11 is a flowchart useful in describing processing according to a third embodiment of the present invention.

FIG. 11 is a flowchart illustrating processing in the host computer 500 for minimizing the number of times the model-specific information is read in according to a third embodiment of the present invention.

When print processing starts, control first proceeds to step S41. Here the printer driver 501 determines whether model-specific information of the printer 100 used in this printing operation has already been read into the printer driver 501 and stored in the model-specific information 502. If this information was read in by the immediately preceding print processing, then control proceeds to step S43 to execute printing using the information that has been stored in the model-specific information 502.

In a case where this information has not been stored in the model-specific information 502, control proceeds to step S42, at which the processing of steps S1 to S3 in FIG. 4 is executed to acquire the model-specific information of the connected printer 100, after which control proceeds to step S43. The ordinary printing operation is carried out at step S43.

Thus, if various information has already been stored in the model-specific information 502, then processing for acquiring model-specific information from the printer will be unnecessary. This makes it possible to shorten printing time.

Fourth Embodiment

In the foregoing embodiments, one type of printing mode of printer 100 is described. In an actual printer, however, there are many cases where a large number of printing modes are available. In such cases, groups of information corresponding to the number of printing modes are prepared in the model-specific information 420 of the printer 100. For example, if there are three types of printing modes, then three sets of model-specific information are prepared. The printer 100 thus sends the host computer 500 model-specific information conforming to the selected printing mode. As a result, it is always possible to perform printing using the optimum parameters and control command. This makes it possible to deal even with a case where resolution or number of tones, for example, changes in dependence upon printing mode.

It should be noted that one set of model-specific information corresponding to each printing mode need be only the parameters A1, A2, . . . described in the foregoing embodiments; B1, B2, . . . and printer-control command information need not be used. Further, model-specific parameters corresponding to a plurality of printing modes may be stored in the ROM 411 upon being separated into common parts and independent parts, and only the independent parts corresponding to common parts and printing mode may be transmitted to the host computer 500. This makes it possible to reduce the memory capacity of the ROM 411 in printer 100. In this case, A1, A2, . . . may be the independent parts and B1, B2, . . . , C may be the common parts.

Furthermore, in a case where the printing mode in the host computer 500 is the same as the immediately preceding printing mode, it is possible to skip the processing that transmits the model-specific information from the printer 100 to the host computer 500.

Figure 12:
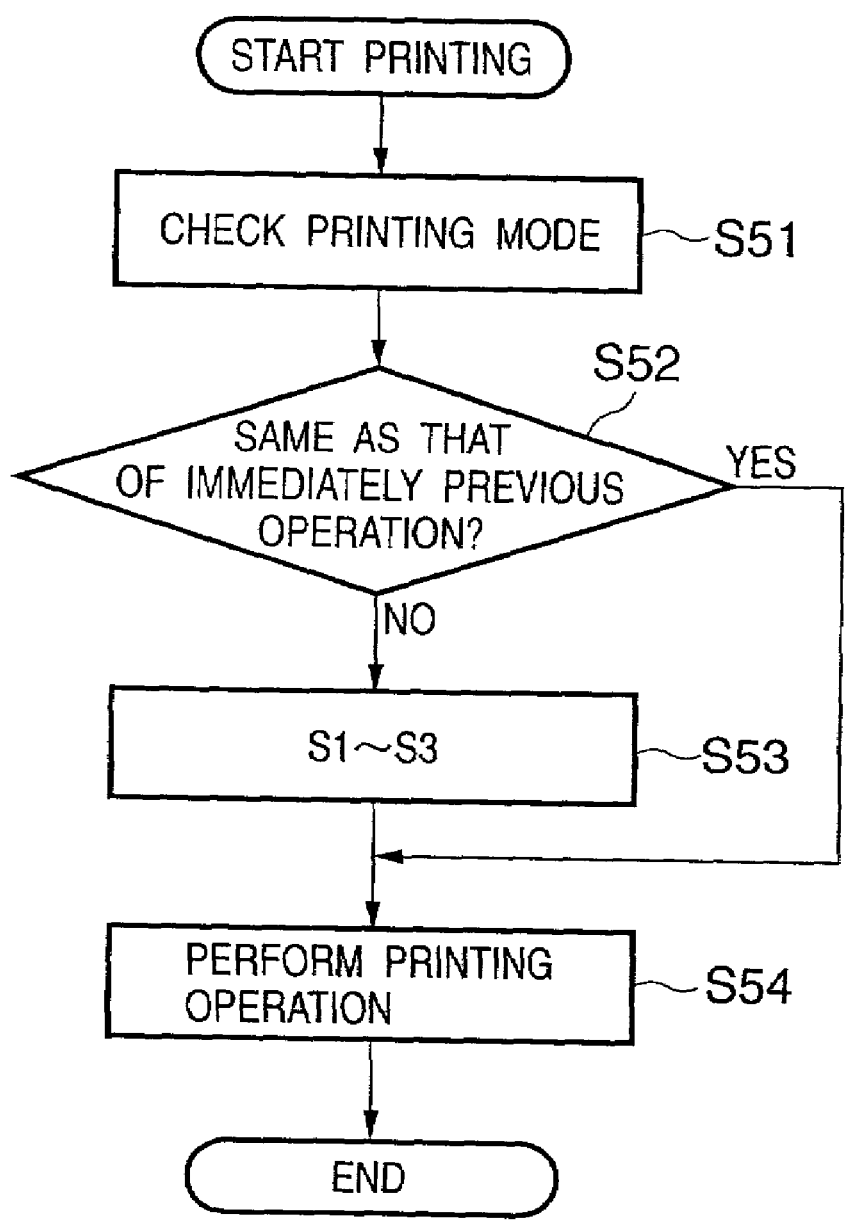
FIG. 12 is a flowchart useful in describing processing according to a fourth embodiment of the present invention.

FIG. 12 is a flowchart of processing in the host computer 500 for a case where the printer 100 is capable of printing in a plurality of modes and processing for transmitting model-specific information from the printer 100 to the host computer 500 is skipped.

First, at step S51, the printing mode is established and then, at step S52, the host computer 500 determines whether the established printing mode is the same as the immediately preceding printing mode. Alternatively, the host computer 500 determines whether the model-specific information of the present printing mode is present in the host computer 500. If this information is present, control proceeds to step S54. Here the host computer 500 executes ordinary print processing by using the parameters and control command that have been stored in the model-specific information 502.

If it is found at step S52 that the printing mode is different from the immediately preceding printing mode, then control proceeds to step S53, where the host computer 500 executes the processing of steps S1 to S3 of FIG. 4 to acquire the model-specific information of printer 100 and create a print command and print data in accordance with this information. Control then proceeds to step S54, at which the ordinary printing operation is carried out and processing is exited. It should be noted that step S54 stores what the present mode is in the printer driver 501 to prepare for the processing of the next printing operation.

When the printing mode is set in this embodiment, the setting may be made on a per-print-job basis or on a per-page basis. Accordingly, if the printing mode changes from page to page when a continuous printing operation is being carried out, then model-specific information is transferred to the host computer 500 from the printer 100 page by page. The printing mode usually does not change within one print job. Therefore, if the printing mode has changed on a per-print-job basis, then model-specific information is transferred on a per-print-job basis.

Fifth Embodiment

In a fifth embodiment, a case in which the host computer 500 capable of being connected to the printer 100 is of a plurality of types will be described.

As set forth above, the host computer 500 serving as the high-order apparatus develops print data upon referring to the model-specific information of the printer 100. However, owing to any difference in the hardware configuration of a high-order apparatus connected to the printer 100, or owing to a difference in a system program or application program even if the hardware configuration is the same, a disparity occurs in the color processing method implemented when print data is developed in the printer driver 501. For example, there are instances where the amounts of data in the color-conversion table information or the data structures do not match.

Accordingly, model-specific information stored in the printer 100 is retained in dependence upon the number of types of host computer 500 that can be connected. In other words, items of model-specific information that are convenient in terms of the structures of connectable host computers 500 are provided in the printer 100.

Figure 13:
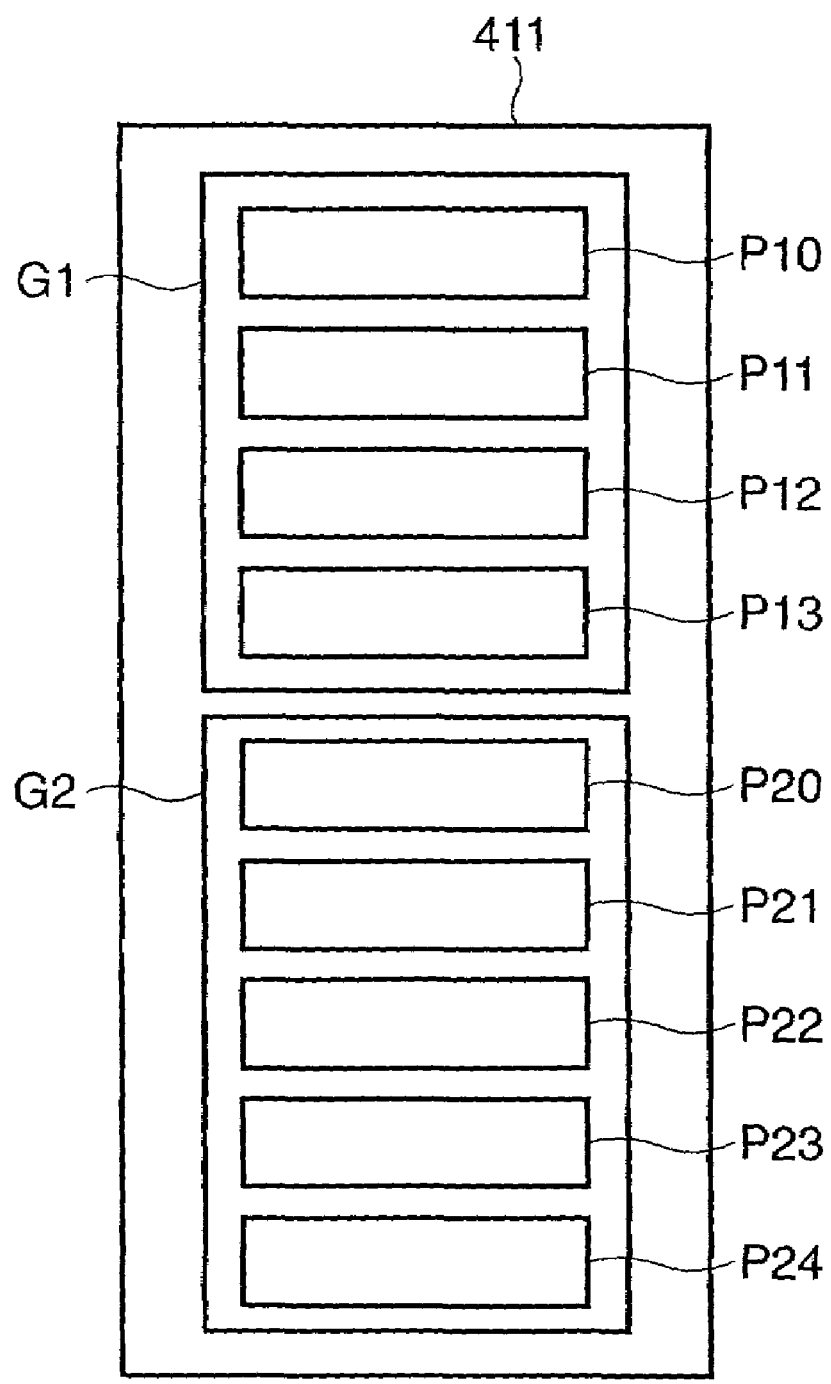
FIG. 13 is a diagram useful in describing an example of model-specific information made to conform to two types of host computers in a printer according to a fifth embodiment of the present invention.

FIG. 13 is a diagram useful in describing an example of model-specific information, which is made to conform to two types of host computers, in the printer 100 according to a fifth embodiment of the present invention.

As shown in FIG. 13, the ROM 411 of printer 100 is provided with blocks G1, G2 for storing two types of model-specific information, where G1 indicates model-specific information for a first high-order apparatus (host computer) and G2 indicates model-specific information for a second high-order apparatus (host computer). In a case where the first high-order apparatus utilizes two printing modes, for example, the following is prepared for G1: an area P10 storing model-specific parameters B1, B2, . . . , an area P11 storing model-specific parameters A11, A12, . . . for the first printing mode, and an area P12 storing model-specific parameters A21, A22, . . . for the second printing mode. Further, P13 indicates a model-specific control command (C1) corresponding to the first high-order apparatus.

In a case where the second high-order apparatus utilizes three printing modes, for example, the following is prepared for G2: an area P20 storing model-specific parameters B1, B2, . . . , an area P21 storing model-specific parameters A11, A12, . . . for the first printing mode, an area P22 storing model-specific parameters A21, A22, . . . for the second printing mode, and an area P23 storing model-specific parameters A31, A32, . . . for the third printing mode. Further, P24 indicates a model-specific control command (C2) corresponding to the second high-order apparatus.

All of these model-specific parameters and control commands are sent from the printer 100 to the host computer 500 based upon a predetermined control command from the host computer 500 and an identifier representing the type of the host computer 500, and they can be acquired selectively by the host computer 500.

In the fifth embodiment, a case in which two high-order apparatus are supported is described. However, it goes without saying that there is no limitation upon the number of types of high-order apparatus that can be supported. Further, there is no limitation upon the content and number of the model-specific parameters and control commands retained in the blocks (G1, G2, etc.) of each of the items of model-specific information.

It should be noted that the printer driver 501 according to this embodiment has been flexibly constructed in advance so as to be capable of supporting various types of parameters and control commands sent from the printer 100, regardless of the values of these parameters and commands. Depending upon the host computer 500, however, there are instances where the utilizable functions of the printer driver 501 are limited. For example, if data of a resolution that exceeds the range of memory utilizable in the host computer 500 has been sent to the host computer 500 as a model-specific parameter, then print data whose printing range has been limited will be sent to the printer 100. However, if the RAM capacity for print processing in the host computer 500 is small and the working area is small, then it will suffice to adopt before a printer driver configuration that conforms to this and no limitation need be imposed upon the printer 100.

In the foregoing embodiments, a case is described in which model-specific parameters and control commands are transmitted from the printer 100 to the host computer 500 immediately after the start of print processing. However, this does not impose a limitation upon the present invention. For example, these may be transmitted when power is introduced to the printer 100. This is effective in that in a case where there is one type of printing mode, it is possible to dispense with processing for transmitting model-specific information from the printer 100 to the host computer 500 when print processing starts (because this information has already been transmitted to and stored in the host computer 500), and therefore printing time from the second printing operation onward can be reduced.

Further, the moment immediately after the start of print processing usually is taken as the moment at which the print job begins. However, if one job consists of the printing of several pages, then the above may be taken as each time that the printing of each page begins.

Further, in the example illustrated above, model-specific parameters and control commands are processed in each step of print-data development processing and print-data transmit processing in the host computer 500. However, this does not impose a limitation upon the present invention. It will suffice if processing for the development and transmission of print data best suited to the particular model is executed utilizing multiple items of model-specific information.

It should be noted that the printer 100 according to this embodiment has ink-jet printing means. Each nozzle of the printhead in the ink-jet printer according to this embodiment is provided with a heating element that generates thermal energy in order to discharge droplets of ink. These heating elements are formed on a substrate consisting of silicon or the like using a film forming technique, and a protective film is formed on the heating element so that the ink will not come into direct contact with the heating elements. Furthermore, nozzles, ink passageways and ink chambers are constructed by building up barrier walls consisting of resin or glass on the substrate. Ink inside a nozzle that has been heated rapidly by the generation of heat from the heating element forms an air bubble due to film boiling, and an ink droplet is discharged toward the printing medium owing to the pressure of the generated air bubble so that a character or image is formed on the printing medium. A method of printing using these heating elements, which are electrothermal transducers, is referred to generically as a bubble-jet printing method because the method uses air bubbles formed by the application of thermal energy when the ink droplets are discharged. The printing system of this embodiment is not limited to printing means that relies upon such a printing method. Another type of ink-jet printing method may be used, such as an ink discharge method that uses a piezoelectric element. Use may be made of a printer such as of the thermal transfer or sublimation type utilizing an ink film, or of another type.

Sixth Embodiment

In the foregoing embodiments, a printing system in which the host computer 500 and printer 100 are connected has been described as an example. However, the present invention is applicable also to a system in which a scanner (image reader) and host computer are connected. For example, in scanners also there are many cases where resolution information, information concerning number of tones and color-conversion information, etc., is specific to each model of the scanner. In other words, it is required that the host computer also execute image reading control, image processing or transfer processing conforming to the functions and capabilities of the connected scanner.

Accordingly, the scanner is provided beforehand with resolution information, information concerning number of tones and color-conversion information, etc., as model-specific information, and the model-specific information is transmitted from the scanner to the host computer. As a result, the host computer is adapted to control the reading of an image based upon the model-specific information, execute processing of the read image and transfer the data to another device. This makes it possible to readily support a new-model scanner without changing the scanner driver, which is a control program by which the host computer controls the scanner.

By way of example, the color-conversion information in the scanner is supplied by a well-known look-up table that decides the gradation of each color of the colors R, G, B from the read image. The look-up table is optimized by the medium read, the characteristics of the image sensor used, the characteristics of the light source and the tones of the image desired to be obtained. For example, if the characteristics of the image sensor have been improved, then it is necessary to change the data in the look-up table. There are occasions where the color-conversion information differs depending upon the reading resolution as well, through this can be dealt with by transferring a look-up table from the scanner to the host computer for every reading mode. On the basis of the look-up table thus transferred, the host computer 500 executes processing to develop the read data into RGB data. This color-conversion information has been stored in the ROM of a scanner 200 (FIG. 14) in an amount equivalent to 64 KB.

Figure 14:
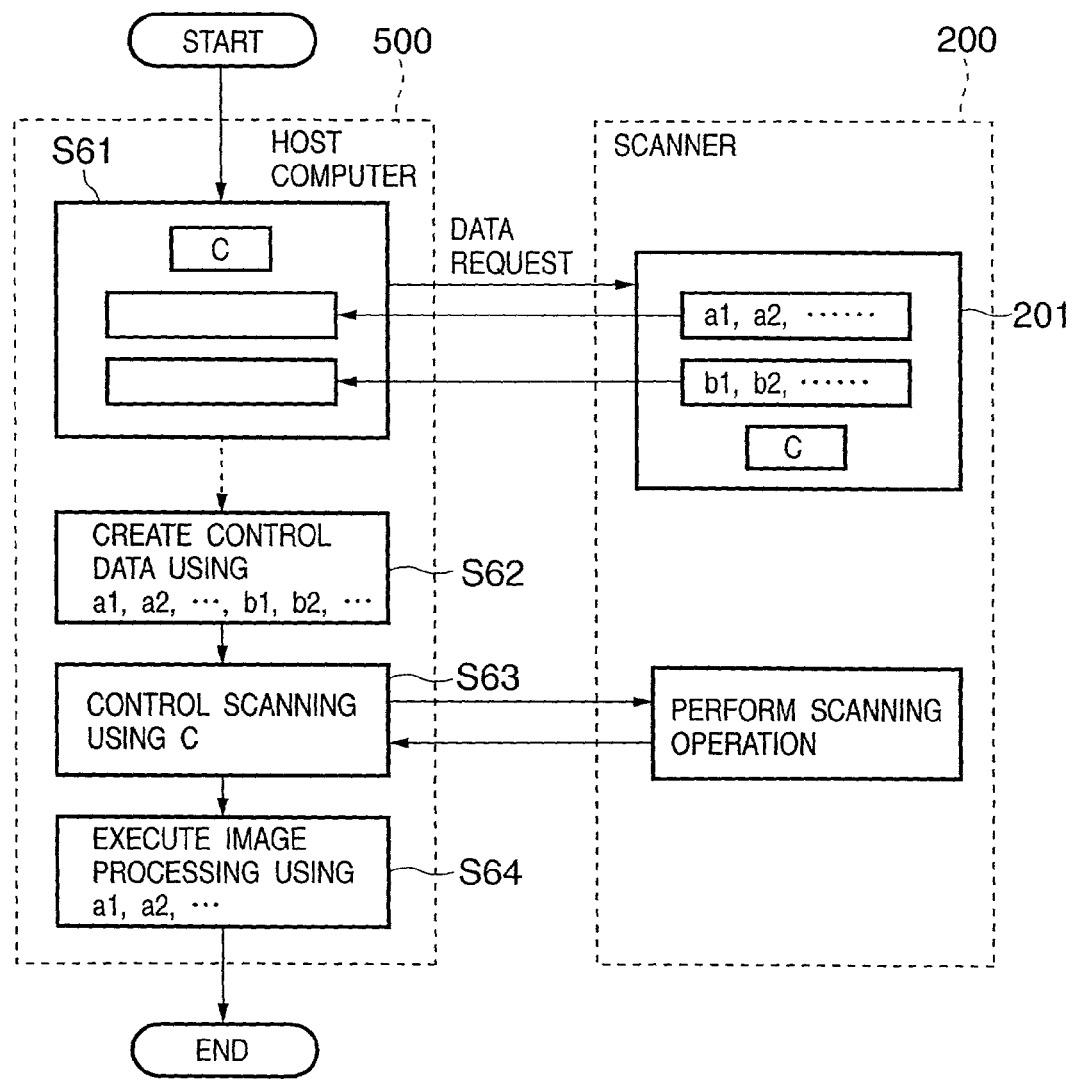
FIG. 14 is a diagram showing a block diagram useful in describing processing according to the sixth embodiment of the present invention, as well as a flowchart of this processing.

FIG. 14 is a diagram showing a block diagram, which illustrates the configuration of a scanner control system according to the sixth embodiment, as well as a flowchart illustrating the processing executed by this system.

When an image scanning operation by the scanner 200 starts in response to a command from the host computer 500, the host computer 500 sends a data request command to the scanner 200 at step S61 in order to acquire the information set forth below. In response, the scanner 200 sends the following items of data to the host computer 500.

a1: resolution information
a2: number-of-tones information
a3: information concerning number of colors used
a4: color-conversion information
b1: maximum scan size information
b2: mechanical-mechanism information
b3: operation-assist information
c: scanner-control command information The resolution information (a1) indicates the resolution at which an image is read when the image is scanned. The number-of-tones information (a2) indicates the data depth (number of bits) per pixel of each color of the colors R, G, B at the above resolution. The information (a3) concerning number of colors used is a numerical value indicative of monochrome or color. The color-conversion information (a4) is table information for subjecting the obtained RGB data to a color conversion. There are also cases where this color-conversion information contains white balance information.

The maximum scan size information (b1) is information that indicates the maximum size capable of being scanned by the scanner 200. The mechanical-mechanism information (b2) is information that indicates the mechanical structure of the scanner 200, such as whether or not it has an automatic sheet feeder and whether the scanning method is a serial scanning method, line scanning method, field sequential reading method or line sequential reading method. The operation-assist information (b3) is information utilized to describe functions and operations specific to the model of the scanner 200 on the operation screen for allowing the user to operate the scanner 200 by commands from the host computer 500. The information (b3) is an auxiliary database displayed on an operating screen of the host computer 500 to make possible command from the user in such a manner that commands relating to the scanning function of the scanner 200 can be entered as by a GUI. For example, this information is text, icon images, an image representing the external form of the scanner or a control panel thereof, or operation control information for controlling the operating screen. This information can be utilized by the host computer 500 upon being acquired from the scanner 200 as necessary. It is possible to provide a user-friendly operating environment in which an operation relating to the connected scanner 200 or on-line help, for example, can be specified, and in which optimum explanatory text and images are displayed for the user.

The scanner-control command information (c) is information sent from the host computer 500 to the scanner 200. This is information relating to a control command for reading and entering a desired image. The information defines a command sequence for controlling the setting of various modes and for controlling the image reading operation in line with the purpose of image scanning.

By controlling the scanner 200 using the scanner-control command information acquired at step S61, the scanner 200 can be made to perform scanning based upon the optimum control command. This scanner-control command information has already been stored in storage means such as a ROM in the scanner 200 in the format of FIG. 9 according to the first embodiment, though the details are not described here.

Next, at step S62, the model-specific information of error correction decoder 200 read in by the host computer 500 is preserved in the scanner driver stored in the host computer 500. This is followed by step S63, at which the scanner 200 is caused to perform a scanning operation in accordance with the model-specific information preserved at step S62. Next, at step S64, the host computer 500 subjects the image information read in at step S63 to image processing using the model-specific information preserved at step S62 and converts the processed image file to the JPEG or other format.

In the foregoing embodiments, a case in which a printer or scanner is connected to a host computer is described. However, even in a case where another type of device is connected to a host computer, the present invention can be applied as long as the device is one which requires that the host computer be equipped with a device driver that conforms to the connected device.

The present invention can be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a recording medium (storage medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes themselves read from the storage medium implement the novel functions of the embodiment and the storage medium storing the program codes constitutes the invention. Furthermore, besides the case where the aforesaid functions according to the embodiments are implemented by executing the program codes read by a computer, the present invention covers a case where an operating system or the like running on the computer performs a part of or the entire process in accordance with the designation of program codes and implements the functions according to the embodiments.

Furthermore, the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entirety of the actual processing in accordance with the designation of program codes and implements the function of the above embodiments by this processing.

In accordance with the embodiments as described above, print processing (or input and processing of image data) can be executed by connecting printers (or scanners) having different functions through use of a printer driver (or scanner driver) of a single type. As a result, it is possible to support various machine models and it is no longer necessary to prepare or distribute the corresponding printer drivers (or scanner drivers).

Further, it is possible to provide a printing system in which printers of multiple types having different capabilities can be controlled by a printer driver of a single type.

Further, it is possible to provide a scanning system in which scanners of multiple types having different capabilities can be controlled by a scanner driver of a single type.

Furthermore, in the prior art, a high-order apparatus is provided with different device drivers corresponding to a plurality of input and output devices such as scanners, and the plurality of input and output devices are used selectively. According to the embodiments of the present invention, however, only one device driver need be prepared. This is advantageous in that the memory area of the hard disk, etc., of the high-order apparatus occupied by device drivers can be reduced.

Further, it is possible to prevent malfunctions caused by a mismatch between the device driver possessed by a high-order apparatus and the connected low-order apparatus.

In addition, in a case where a device driver such as a scanner driver has been stored on a read-only storage medium, low-order apparatus (printers or scanners) of a plurality of types having different capabilities can be controlled using this device driver.

The present invention is not limited to the above embodiments and various changes and modifications can be made within the spirit and scope of the present invention. Therefore, to apprise the public of the scope of the present invention, the following claims are made.

What is claimed is:

1. An information processing system comprising:
a high-order apparatus; and
a low-order apparatus connected to the high-order apparatus so as to be capable of bidirectional communicating therewith,
wherein the low-order apparatus stores control command information of the low-order apparatus and transmits the control command information to the high-order apparatus in response to a request from the high-order apparatus, and
wherein the high-order apparatus controls the low-order apparatus using the control command information,
wherein the high-order apparatus has the control command information of a specific low-order apparatus stored in advance, and
wherein the high-order apparatus includes means for determining the model of the low-order apparatus, and means for refraining from requesting the low-order apparatus to transmit the control command information in a case that the high-order apparatus determines that the model of the low-order apparatus is a specific model.

2. The system according to claim 1, wherein the low-order apparatus is a printing apparatus.

3. The system according to claim 1, wherein the low-order apparatus is an image reading apparatus.

4. The system according to claim 1, wherein the control command information is information for setting the resolution of images produced by the low-order apparatus.

5. The system according to claim 1, wherein the control command information is information for setting the number of tones of an image produced by the low-order apparatus.

6. The system according to claim 1, wherein the control command information is information for setting the number of colors of an image produced by the low-order apparatus.

7. The system according to claim 1, wherein the control command information is information for setting the image size of an image produced by in the low-order apparatus.

8. The system according to claim 1, wherein the low-order apparatus transmits the control command information to the high-order apparatus in response to an operation command from the high-order apparatus.

9. The system according to claim 1, wherein the high-order apparatus operates in a plurality of operating modes and the control command information is transmitted to the high-order apparatus in conformity with the operating mode of the high-order apparatus.

10. An information processing apparatus for controlling a low-order apparatus, comprising:
requesting means for requesting that the low-order apparatus transmit control command information of the low-order apparatus;
receiving means for receiving the control command information transmitted from the low-order apparatus in response to the request from said requesting means;
control means for controlling the low-order apparatus using the control command information received by said receiving means;
storage means for storing the control command information of a specific low-order apparatus in advance;
determining means for determining the model of the low-order apparatus; and means for skipping the requesting of the low-order apparatus to transmit the control command information in a case that said determining means determines that the model of the low-order apparatus is a specific model.

11. The apparatus according to claim 10, wherein the low-order apparatus is a printing apparatus.

12. The apparatus according to claim 10, wherein the low-order apparatus is an image reading apparatus.

13. The apparatus according to claim 10, wherein the control command information is information for setting the resolution of an image produced by the low-order apparatus.

14. The apparatus according to claim 10, wherein the control command information is information for setting the number of tones of an image produced by the low-order apparatus.

15. The apparatus according to claim 10, wherein the control command information is information for setting the number of colors of an image produced by the low-order apparatus.

16. The apparatus according to claim 10, wherein the control command information is information for setting the image size of an image produced by the low-order apparatus.

17. An information processing method performed by an information processing apparatus for controlling a low-order apparatus, comprising:
   a requesting step of requesting that the low-order apparatus transmit control command information of the low-order apparatus;
   a receiving step of receiving the control command information transmitted from the low-order apparatus in response to the request produced at the requesting step;
   a control step of controlling the low-order apparatus using the control command information received at the receiving step;
   a determinig step of determining the model of the low-order apparatus; and
   a refraining step of refraining from requesting in said requesting step that the low-order apparatus transmit control command information of the low-order apparatus in a case that the information processing apparatus has the control command information of a specific low-order apparatus stored in advance and the model of the low-order apparatus is a specific model.

18. The method according to claim 17, wherein the low-order apparatus is a printing apparatus.

19. The method according to claim 17, wherein the low-order apparatus is an image reading apparatus.

20. The method according to claim 17, wherein the control command information is information for setting the resolution of an image produced by the low-order apparatus.

21. The method according to claim 17, wherein the control command information for setting the number of tones of an image produced by the low-order apparatus.

22. The method according to claim 17, wherein the control command information is information for setting the number of colors of an image produced by the low-order apparatus.

23. The method according to claim 17, wherein the control command information is information for setting the image size of an image produced by the low-order apparatus.

24. A device driver, which is stored in a high-order apparatus, for controlling a low-order apparatus connected to the high-order apparatus, the device driver comprising:
   requesting means for requesting that the low-order apparatus transmit command control information of the low-order apparatus;
   storage means for receiving and storing the control command information transmitted from the low-order apparatus in response to the request from said requesting means, said storage means storing the control command information of a specific low-order apparatus in advance;
   control means for controlling the low-order apparatus based upon the control command information that has been stored in said storage means;
   determining means for determining the model of the low-order apparatus; and
   means for skipping requesting the low-order apparatus to transmit the control command information in a case that said determining means determines that the model of the low-order apparatus is a specific model.

25. A device driver, which is stored in a high-order apparatus, for controlling a low-order apparatus connected to the high-order apparatus, the device driver instructing the performing of a method comprising:
   a requesting step of requesting that the low-order apparatus transmit command control information of the low-order apparatus;
   a storage step of receiving and storing in a memory the control command information transmitted from the low-order apparatus in response to the request produced by said requesting step;
   a control step of controlling the low-order apparatus based upon the control command information that has been stored in the memory;
   a determining step of determining the model of the low-order apparatus; and
   a refraining step of refraining from requesting in said requesting step that the low-order apparatus transmit command control information of the low-order apparatus in a case that the high-order apparatus has the control command information of a specific low-order apparatus stored in advance and the model of the low-order apparatus is a specific model.

26. The device driver according to claim 24, wherein the low-order apparatus is a printing apparatus.

27. The device driver according to claim 24, wherein the low-order apparatus is an image reading apparatus.

28. The device driver according to claim 24, wherein the control command information is information for setting the resolution of an image produced by the low-order apparatus.

29. The device driver according to claim 24, wherein the control command information is information for setting the number of tones of an image produced by the low-order apparatus.

30. The device driver according to claim 24, wherein the control command information is information for setting the number of colors of an image produced by the low-order apparatus.

31. The device driver according to claim 24, wherein the control command information is information for setting the image size of an image produced by the low-order apparatus.

32. The device driver according to claim 24, wherein the low-order apparatus transmits the control command information to the high-order apparatus in response to an operation command from the high-order apparatus.

33. The device driver according to claim 24, wherein the high-order apparatus operates in a plurality of operating modes and the control command information is transmitted to the high-order apparatus in conformity with the operating mode of the high-order apparatus.

34. An information processing system comprising:

a high-order apparatus; and a low-order apparatus connected to the high-order apparatus so as to be capable of bidirectional communicating therewith, wherein the low-order apparatus stores control command information of the low-order apparatus and transmits the control command information to the high-order apparatus in response to a command from the high-order apparatus, wherein the high-order apparatus directly controls the low-order apparatus using the control command information without the use of an intermediate apparatus having a random access memory and a central processing unit between the high-order and low-order apparatus, wherein the control command information stored in the low-order apparatus and directly transmitted to the high-order apparatus comprises:

image information relating to the characteristics of image data able to be processed by the low-order apparatus; and low-order-apparatus information relating to the characteristics of the low-order apparatus that affect the output of the image data able to be processed by the low-order apparatus, wherein the high-order apparatus develops and transmits to the low-order apparatus image data representing an image to be output from the low-order apparatus based on the image information relating to the characteristics of image data able to be processed by the low-order apparatus that is transmitted to the high-order apparatus, and wherein the high-order apparatus generates and transmits to the low-order apparatus command data controlling the outputting of image data from the low-order apparatus based on the information relating to the characteristics of the low-order apparatus that affect the output of image data to be processed by the low-order apparatus transmitted to the high-order apparatus.

35. An information processing system comprising:

a high-order apparatus; and a low-order apparatus connected to the high-order apparatus so as to be capable of bidirectional communicating therewith, wherein the low-order apparatus stores control command information of the low-order apparatus and transmits the control command information to the high-order apparatus in response to a command from the high-order apparatus, wherein the high-order apparatus directly controls the low-order apparatus using the control command information without the use of an intermediate apparatus having a random access memory and a central processing unit between the high-order and low-order apparatus, wherein the control command information stored in the low-order apparatus and transmitted to the high-order apparatus comprises:

image information relating to the characteristics of image data able to be processed by the low-order apparatus; and low-order-apparatus information relating to the characteristics of the low-order apparatus that affect the output of image data by the low-order apparatus, wherein the high-order apparatus generates a final-format command instructing the low-order apparatus to output particular image data specified in the final-formal command in a format specified in the final-format command based on the image information relating to the characteristics of image data able to be processed by the low-order apparatus, and the low-order-apparatus information relating to the characteristics of the low-order apparatus that affect the output of image data by the low-order apparatus, wherein the high-order apparatus transmits the final-format command directly to the low-order apparatus, and wherein the low-order apparatus outputs the particular image data specified in the final-format command in the format specified by the final-format command.

36. An information processing system comprising:

a high-order apparatus; and a low-order apparatus connected to the high-order apparatus so as to be capable of bidirectional communicating therewith, wherein the low-order apparatus stores control command information of the low-order apparatus and transmits the control command information to the high-order apparatus in response to a command from the high-order apparatus, wherein the high-order apparatus directly controls the low-order apparatus using the control command information without the use of an intermediate apparatus having a random access memory and a central processing unit between the high-order and low-order apparatus, wherein the low-order apparatus is a scanner, wherein the control command information stored in the scanner and transmitted to the high-order apparatus comprises:

image information relating to the characteristics of image data able to be processed by the scanner; and scanner information relating to the characteristics of the scanner that affect the scanning of an image, wherein the high-order apparatus controls the scanning of the scanner based on the image information relating to the characteristics of image data able to be processed by the scanner, and the scanner information relating to the characteristics of the scanner that affect the scanning of an image, wherein the high-order apparatus subjects the image data generated by the scanner to image processing using the image information relating to the characteristics of image data able to be processed by the scanner, and the scanner information relating to the characteristics of the scanner that affect the scanning of an image.

37. An information processing apparatus for controlling a low-order apparatus comprising:

requesting means for requesting that the low-order apparatus transmit control command information of the low-order apparatus;

receiving means for receiving the control command information transmitted from the low-order apparatus in response to the request from said requesting means; and control means for directly controlling the low-order apparatus using the control command information received by said receiving means without the use of an intermediate apparatus having a random access memory and a central processing unit between the information processing apparatus and the low-order apparatus, wherein the control command information received by the receiving means comprises:

image information relating to the characteristics of image data able to be processed by the low-order apparatus; and low-order-apparatus information relating to the characteristics of the low-order apparatus that affect the output of the image data able to be processed by the low-order apparatus, wherein said apparatus develops and transmits to the low-order apparatus image data representing an image to be output from the low-order apparatus based on the image information relating to the characteristics of image data able to be processed by the low-order apparatus that is received by said receiving means, and wherein said apparatus generates and transmits to the low-order apparatus command data controlling the outputting of image data from the low-order apparatus based on the information relating to the characteristics of the low-order apparatus that affect the output of image data to be processed by the low-order apparatus received by said receiving means.

38. An information processing apparatus for controlling a low-order apparatus, comprising:

requesting means for requesting that the low-order apparatus transmit control command information of the low-order apparatus;

receiving means for receiving the control command information transmitted from the low-order apparatus in response to the request from said requesting means; and control means for directly controlling the low-order apparatus using the control command information received by said receiving means without the use of an intermediate apparatus having a random access memory and a central processing unit between the information processing apparatus and the low-order apparatus, wherein the control command information received by said receiving means comprises:

image information relating to the characteristics of image data able to be processed by the low-order apparatus; and low-order-apparatus information relating to the characteristics of the low-order apparatus that affect the output of image data by the low-order apparatus, wherein said apparatus generates a final-format command instructing the low-order apparatus to output particular image data specified in the final-formal command in a format specified in the final-format command based on the image information relating to the characteristics of image data able to be processed by the low-order apparatus, and the low-order-apparatus information relating to the characteristics of the low-order apparatus that affect the output of image data by the low-order apparatus, wherein said apparatus transmits the final-format command directly to the low-order apparatus, and wherein the low-order apparatus outputs the particular image data specified in the final-format command in the format specified by the final-format command.

39. An information processing apparatus for controlling a low-order apparatus, comprising:

requesting means for requesting that the low-order apparatus transmit control command information of the low-order apparatus;

receiving means for receiving the control command information transmitted from the low-order apparatus in response to the request from said requesting means; and control means for directly controlling the low-order apparatus using the control command information received by said receiving means without the use of an intermediate apparatus having a random access memory and a central processing unit between the information processing apparatus and the low-order apparatus, wherein the low-order apparatus is a scanner, wherein the control command information stored in the scanner and received by said receiving means comprises:

image information relating to the characteristics of image data able to be processed by the scanner; and scanner information relating to the characteristics of the scanner that affect the scanning of an image, wherein said apparatus controls the scanning of the scanner based on the image information relating to the characteristics of image data able to be processed by the scanner, and the scanner information relating to the characteristics of the scanner that affect the scanning of an image, wherein said apparatus subjects the image data generated by the scanner to image processing using the image information relating to the characteristics of image data able to be processed by the scanner, and the scanner information relating to the characteristics of the scanner that affect the scanning of an image.

40. An information processing method performed by an information processing apparatus for controlling a low-order apparatus under the control of a control program, comprising:

a requesting step of requesting that the low-order apparatus transmit control command information of the low-order apparatus;

a receiving step of receiving the control command information transmitted from the low-order apparatus in response to the request produced at the requesting step; and a control step of directly controlling the low-order apparatus using the control command information received at the receiving step without the use of an intermediate apparatus having a random access memory and a central processing unit between the information processing apparatus and the low-order apparatus, wherein the control command information received by said receiving step comprises:

image information relating to the characteristics of image data able to be processed by the low-order apparatus; and low-order-apparatus information relating to the characteristics of the low-order apparatus that affect the output of the image data able to be processed by the low-order apparatus, wherein said control step develops and transmits to the low-order apparatus image data representing an image to be output from the low-order apparatus based on the image information relating to the characteristics of image data able to be processed by the low-order apparatus that is received by said receiving step, and wherein said control step generates and transmits to the low-order apparatus command data controlling the outputting of image data from the low-order apparatus based on the information relating to the characteristics of the low-order apparatus that affect the output of image data to be processed by the low-order apparatus received by said receiving step.

41. An information processing method performed by an information processing apparatus for controlling a low-order apparatus under the control of a control program, comprising:

a requesting step of requesting that the low-order apparatus transmit control command information of the low-order apparatus;

a receiving step of receiving the control command information transmitted from the low-order apparatus in response to the request produced at the requesting step; and a control step of directly controlling the low-order apparatus using the control command information received at the receiving step without the use of an intermediate apparatus having a random access memory and a central processing unit between the information processing apparatus and the low-order apparatus, wherein the control command information received by said receiving step comprises:

image information relating to the characteristics of image data able to be processed by the low-order apparatus; and low-order-apparatus information relating to the characteristics of the low-order apparatus that affect the output of image data by the low-order apparatus, wherein said control step generates a final-format command instructing the low-order apparatus to output particular image data specified in the final-formal command in a format specified in the final-format command based on the image information relating to the characteristics of image data able to be processed by the low-order apparatus, and the low-order-apparatus information relating to the characteristics of the low-order apparatus that affect the output of image data by the low-order apparatus, wherein said control step transmits the final-format command directly to the low-order apparatus, and wherein the low-order apparatus outputs the particular image data specified in the final-format command in the format specified by the final-format command.

42. An information processing method performed by an information processing apparatus for controlling a low-order apparatus under the control of a control program, comprising:

a requesting step of requesting that the low-order apparatus transmit control command information of the low-order apparatus;

a receiving step of receiving the control command information transmitted from the low-order apparatus in response to the request produced at the requesting step; and a control step of directly controlling the low-order apparatus using the control command information received at the receiving step without the use of an intermediate apparatus having a random access memory and a central processing unit between the information processing apparatus and the low-order apparatus, wherein the low-order apparatus is a scanner, wherein the control command information stored in the scanner and received by said receiving step comprises:

image information relating to the characteristics of image data able to be processed by the scanner; and scanner information relating to the characteristics of the scanner that affect the scanning of an image, wherein said control step controls the scanning of the scanner based on the image information relating to the characteristics of image data able to be processed by the scanner, and the scanner information relating to the characteristics of the scanner that affect the scanning of an image, wherein said control step subjects the image data generated by the scanner to image processing using the image information relating to the characteristics of image data able to be processed by the scanner, and the scanner information relating to the characteristics of the scanner that affect the scanning of an image.

43. A device driver, which is stored in a high-order apparatus, for controlling a low-order apparatus connected to the high-order apparatus, the device driver comprising:

requesting means for requesting that the low-order apparatus transmit command control information of the low-order apparatus;

storage means for receiving and storing the control command information transmitted from the low-order apparatus in response to the request from said requesting means; and control means for directly controlling the low-order apparatus based upon the control command information that has been stored in said storage means without the use of an intermediate apparatus having a random access memory and a central processing unit between the high-order apparatus and the low-order apparatus, wherein the control command information received by the storage means comprises:

image information relating to the characteristics of image data able to be processed by the low-order apparatus; and low-order-apparatus information relating to the characteristics of the low-order apparatus that affect the output of the image data able to be processed by the low-order apparatus, wherein the high-order apparatus develops and transmits to the low-order apparatus image data representing an image to be output from the low-order apparatus based on the image information relating to the characteristics of image data able to be processed by the low-order apparatus that is received by said storage means, and wherein the high-order apparatus generates and transmits to the low-order apparatus command data controlling the outputting of image data from the low-order apparatus based on the information relating to the characteristics of the low-order apparatus that affect the output of image data to be processed by the low-order apparatus received by said storage means.

44. A device driver, which is stored in a high-order apparatus, for controlling a low-order apparatus connected to the high-order apparatus, the device driver comprising:

requesting means for requesting that the low-order apparatus transmit command control information of the low-order apparatus;

storage means for receiving and storing the control command information transmitted from the low-order apparatus in response to the request from said requesting means; and control means for directly controlling the low-order apparatus based upon the control command information that has been stored in said storage means without the use of an intermediate apparatus having a random access memory and a central processing unit between the high-order apparatus and the low-order apparatus, wherein the control command information received by said storage means comprises:

image information relating to the characteristics of image data able to be processed by the low-order apparatus; and low-order-apparatus information relating to the characteristics of the low-order apparatus that affect the output of image data by the low-order apparatus, wherein the high-order apparatus generates a final-format command instructing the low-order apparatus to output particular image data specified in the final-formal command in a format specified in the final-format command based on the image information relating to the characteristics of image data able to be processed by the low-order apparatus, and the low-order-apparatus information relating to the characteristics of the low-order apparatus that affect the output of image data by the low-order apparatus, wherein the high-order apparatus transmits the final-format command directly to the low-order apparatus, and wherein the low-order apparatus outputs the particular image data specified in the final-format command in the format specified by the final-format command.

45. A device driver, which is stored in a high-order apparatus, for controlling a low-order apparatus connected to the high-order apparatus, the device driver comprising:

requesting means for requesting that the low-order apparatus transmit command control information of the low-order apparatus;

storage means for receiving and storing the control command information transmitted from the low-order apparatus in response to the request from said requesting means; and control means for directly controlling the low-order apparatus based upon the control command information that has been stored in said storage means without the use of an intermediate apparatus having a random access memory and a central processing unit between the high-order apparatus and the low-order apparatus, wherein the low-order apparatus is a scanner, wherein the control command information stored in the scanner and received by said storage means comprises:
image information relating to the characteristics of image data able to be processed by the scanner; and
scanner information relating to the characteristics of the scanner that affect the scanning of an image, wherein the high-order apparatus controls the scanning of the scanner based on the image information relating to the characteristics of image data able to be processed by the scanner, and the scanner information relating to the characteristics of the scanner that affect the scanning of an image, wherein the high-order apparatus subjects the image data generated by the scanner to image processing using the image information relating to the characteristics of image data able to be processed by the scanner, and the scanner information relating to the characteristics of the scanner that affect the scanning of an image.

46. A device driver, which is stored in a high-order apparatus, for controlling a low-order apparatus connected to the high-order apparatus, the device driver instructing the performing of a method comprising:

a requesting step of requesting that the low-order apparatus transmit command control information of the low-order apparatus;

a storage step of receiving and storing in a memory the control command information transmitted from the low-order apparatus in response to the request produced by said requesting step; and a control step of directly controlling the low-order apparatus based upon the control command information that has been stored in the memory without the use of an intermediate apparatus having a random access memory and a central processing unit between the high-order apparatus and the low-order apparatus, wherein the control command information received by said storage step comprises:
image information relating to the characteristics of image data able to be processed by the low-order apparatus; and
low-order-apparatus information relating to the characteristics of the low-order apparatus that affect the output of the image data able to be processed by the low-order apparatus, wherein said control step develops and transmits to the low-order apparatus image data representing an image to be output from the low-order apparatus based on the image information relating to the characteristics of image data able to be processed by the low-order apparatus that is received by said storage step, and wherein said control step generates and transmits to the low-order apparatus command data controlling the outputting of image data from the low-order apparatus based on the information relating to the characteristics of the low-order apparatus that affect the output of image data to be processed by the low-order apparatus received by said storage step.

47. A device driver, which is stored in a high-order apparatus, for controlling a low-order apparatus connected to the high-order apparatus, the device driver instructing the performing of a method comprising:

a requesting step of requesting that the low-order apparatus transmit command control information of the low-order apparatus;

a storage step of receiving and storing in a memory the control command information transmitted from the low-order apparatus in response to the request produced by said requesting step; and a control step of directly controlling the low-order apparatus based upon the control command information that has been stored in the memory without the use of an intermediate apparatus having a random access memory and a central processing unit between the high-order apparatus and the low-order apparatus, wherein the control command information received by said storage step comprises:
image information relating to the characteristics of image data able to be processed by the low-order apparatus; and
low-order-apparatus information relating to the characteristics of the low-order apparatus that affect the output of image data by the low-order apparatus, wherein said control step generates a final-format command instructing the low-order apparatus to output particular image data specified in the final-formal command in a format specified in the final-format command based on the image information relating to the characteristics of image data able to be processed by the low-order apparatus, and the low-order-apparatus information relating to the characteristics of the low-order apparatus that affect the output of image data by the low-order apparatus, wherein said control step transmits the final-format command directly to the low-order apparatus, and wherein the low-order apparatus outputs the particular image data specified in the final-format command in the format specified by the final-format command.

48. A device driver, which is stored in a high-order apparatus, for controlling a low-order apparatus connected to the high-order apparatus, the device driver instructing the performing of a method comprising:
- a requesting step of requesting that the low-order apparatus transmit command control information of the low-order apparatus;
- a storage step of receiving and storing in a memory the control command information transmitted from the low-order apparatus in response to the request produced by said requesting step; and
- a control step of directly controlling the low-order apparatus based upon the control command information that has been stored in the memory without the use of an intermediate apparatus having a random access memory and a central processing unit between the high-order apparatus and the low-order apparatus,
- wherein the low-order apparatus is a scanner,
- wherein the control command information stored in the scanner and received by said storage step comprises:
  - image information relating to the characteristics of image data able to be processed by the scanner; and
  - scanner information relating to the characteristics of the scanner that affect the scanning of an image,
- wherein said control step controls the scanning of the scanner based on the image information relating to the characteristics of image data able to be processed by the scanner, and the scanner information relating to the characteristics of the scanner that affect the scanning of an image,
- wherein said control step subjects the image data generated by the scanner to image processing using the image information relating to the characteristics of image data able to be processed by the scanner, and the scanner information relating to the characteristics of the scanner that affect the scanning of an image.

49. An information processing system comprising:
- a high-order apparatus; and
- a low-order apparatus connected to the high-order apparatus so as to be capable of bidirectional communicating therewith,
- wherein the low-order apparatus stores control command information of the low-order apparatus and transmits the control command information to the high-order apparatus in response to a request from the high-order apparatus,
- wherein the high-order apparatus stores in a memory the control command information transmitted from the low-order apparatus and controls the low-order apparatus using the control command information stored in the memory, and
- wherein the high-order apparatus includes means for determining whether the control command information has been already stored in the memory, and means for refraining from requesting the low-order apparatus to transmit the control command information in a case that the control command information has been already stored in the memory.

50. An information processing apparatus for controlling a low-order apparatus, comprising:
- requesting means for requesting that the low-order apparatus transmit control command information of the low-order apparatus;
- receiving means for receiving the control command information transmitted from the low-order apparatus in response to the request from said requesting means;
- storage means for storing the control command information received by said receiving means;
- control means for controlling the low-order apparatus using the control command information stored in the storage means;
- determining means for determining whether the control command information has been already stored in the storage means; and
- means for skipping requesting the low-order apparatus to transmit the control command information in a case where said determining means determines that the control command information has been already stored in said storage means.

51. An information processing method performed by an information processing apparatus for controlling a low-order apparatus, comprising:
- a requesting step of requesting that the low-order apparatus transmit control command information of the low-order apparatus;
- a receiving step of receiving the control command information transmitted from the low-order apparatus in response to the request produced at the requesting step;
- a storing step of storing in a memory the control command information received in said receiving step;
- a control step of controlling the low-order apparatus using the control command information stored in the memory;
- a determining step of determining whether the control command information has been already stored in the memory; and
- a refraining step of refraining from requesting in said requesting step that the low-order apparatus transmit control command information of the low-order apparatus in a case where it is determined in said determining step that the control command information has been already stored in the memory.

52. A device driver, which is stored in a high-order apparatus, for controlling a low-order apparatus connected to the high-order apparatus, the device driver instructing the performing of a method comprising:
- a requesting step of requesting that the low-order apparatus transmit command control information of the low-order apparatus;
- a storage step of receiving and storing in a memory the control command information transmitted from the low-order apparatus in response to the request produced by said requesting step;
- a control step of controlling the low-order apparatus based upon the control command information that has been stored in the memory;
- a determining step of determining whether the control command information has been already stored in the memory; and
- a refraining step of refraining from requesting in said requesting step that the low-order apparatus transmit command control information of the low-order apparatus in a case where it is determined in said determining step that the control command information has been already stored in the memory.

* * * * *

UNITED STATES PATENT AND TRADEMARK OFFICE
CERTIFICATE OF CORRECTION

PATENT NO. : 7,095,520 B2 Page 1 of 1
APPLICATION NO. : 09/945797
DATED : August 22, 2006
INVENTOR(S) : Tetsuya Kawanabe et al.

It is certified that error appears in the above-identified patent and that said Letters Patent is hereby corrected as shown below:

COLUMN 2:
Line 2, "unit" should read --unit are--.
Line 59, "added" should read --add--.

COLUMN 7:
Line 39, "can not" should read --cannot--.

COLUMN 8:
Line 8, "optimised" should read --optimized--.

COLUMN 11:
Line 28, "an" should read --a--.

COLUMN 26:
Line 1, "final-formal" should read --final-format--.

COLUMN 27:
Line 45, "final-formal" should read --final-format--.

COLUMN 29:
Line 24, "final-formal" should read --final-format--.

COLUMN 31:
Line 6, "final-formal" should read --final-format--.

COLUMN 32:
Line 54, "final-formal" should read --final-format--.

Signed and Sealed this

Eleventh Day of March, 2008

JON W. DUDAS
*Director of the United States Patent and Trademark Office*